United States Patent
Yamada et al.

(10) Patent No.: US 9,550,531 B2
(45) Date of Patent: Jan. 24, 2017

(54) VEHICLE BODY REAR STRUCTURE

(71) Applicant: HONDA MOTOR CO., LTD., Tokyo (JP)

(72) Inventors: Eiji Yamada, Wako (JP); Harumasa Toyosawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 14/423,263

(22) PCT Filed: Jul. 17, 2013

(86) PCT No.: PCT/JP2013/069381
§ 371 (c)(1),
(2) Date: Feb. 23, 2015

(87) PCT Pub. No.: WO2014/034309
PCT Pub. Date: Mar. 6, 2014

(65) Prior Publication Data
US 2015/0251703 A1   Sep. 10, 2015

(30) Foreign Application Priority Data

Aug. 31, 2012   (JP) .................................. 2012-191768
Aug. 31, 2012   (JP) .................................. 2012-191855
Aug. 31, 2012   (JP) .................................. 2012-191942

(51) Int. Cl.
  *B62D 21/00*   (2006.01)
  *B62D 21/15*   (2006.01)
  *B62D 25/08*   (2006.01)
  *B62D 27/02*   (2006.01)

(52) U.S. Cl.
CPC ........... *B62D 21/157* (2013.01); *B62D 25/087* (2013.01); *B62D 25/088* (2013.01); *B62D 27/02* (2013.01)

(58) Field of Classification Search
CPC ... B62D 21/157; B62D 25/087; B62D 25/088; B62D 27/02
USPC ...................................................... 296/203.04
See application file for complete search history.

(56) References Cited

U.S. PATENT DOCUMENTS 5,102,186 A * 4/1992 Yoshii ................. B62D 25/088
                                                     296/203.04
6,196,622 B1 * 3/2001 Brodt ................... B62D 25/087
                                                     296/203.04

FOREIGN PATENT DOCUMENTS

| JP | H02-126979 | 10/1990 |
| JP | H05-92064 | 12/1993 |
| JP | H06-55953 | 8/1994 |
| JP | 09-240510 | 9/1997 |

(Continued)

OTHER PUBLICATIONS

International Search Report, Date of mailing: Aug. 27, 2013 (Aug. 27, 2013).

*Primary Examiner* — Joseph D Pape
(74) *Attorney, Agent, or Firm* — Rankin, Hill & Clark LLP

(57) ABSTRACT

A vehicle body rear structure includes a rear parcel provided between left and right vehicle body side parts, a parcel cross member bonded to the rear parcel and constituting a first closed cross section, and a parcel member and parcel support bonded to the first closed cross section and constituting the main section of a second closed cross section. The first closed cross section is configured from the rear parcel and the parcel cross member. Furthermore, the first closed cross section continues through the main section of the second closed cross section to the left vehicle body side part.

13 Claims, 18 Drawing Sheets

(56) References Cited

FOREIGN PATENT DOCUMENTS

| | | |
|---|---|---|
| JP | 11-348826 | 12/1999 |
| JP | 2006-069268 | 3/2006 |
| JP | 2008-162297 | 7/2008 |
| JP | 2009-001197 | 1/2009 |
| JP | 2009-023367 | 2/2009 |

* cited by examiner

VEHICLE BODY REAR STRUCTURE

TECHNICAL FIELD

The present invention relates to a vehicle body rear structure in which left and right vehicle body side parts are configured from a rear wheel house and a rear pillar, a rear parcel is provided between the left and right vehicle body side parts, and a trunk and passenger compartment are partitioned by the rear parcel.

BACKGROUND ART

Certain vehicle body rear structures have a rear parcel provided between left and right vehicle body side parts, the trunk and the passenger compartment being partitioned by the rear parcel, and a closed cross section being provided in a front end part of the rear parcel (see Patent Literature 1, for example). This closed cross section is provided across left and right wheel houses, and left and right end parts are located at the tops of the left and right wheel houses. The left and right end parts are made to open upward, and these openings are thereby located at the tops of the left and right wheel houses. Forming these openings in the left and right end parts ensures space for attaching a damper (a shock absorber) to the tops of the left and right wheel houses.

However, in the vehicle body rear structure of Patent Literature 1, the left and right end parts are located at predetermined gaps from the left and right vehicle body side parts because the left and right end parts of the closed cross section are made to open upward. Therefore, it is difficult for a load to be suitably (efficiently) transferred between the left and right vehicle body side parts and the closed cross section (the rear parcel), in which regard there is room for improvement.

Additionally, in certain vehicle body rear structures, a first reinforcement is provided to a wheel house, a second reinforcement is provided to the first reinforcement, a damper base (a damper bracket) is supported by the second reinforcement, and the top part of a damper (a shock absorber) is provided on the damper base (see Patent Literature 2, for example). In this vehicle body rear structure, the rigidity and strength of the damper base can be ensured by reinforcing the damper base using the first reinforcement and second reinforcement.

There is demand for further increasing the rigidity and strength of the damper base in order to suitably support the top part of the damper with the damper base. However, as in the vehicle body rear structure of Patent Literature 2, it is difficult to sufficiently increase the rigidity and strength of the damper base in accordance with demand by combining only single reinforcing members such as the first reinforcement or the second reinforcement.

Other known examples of vehicle body rear structures include those in which a linking gusset extends rearward in the vehicle body from the top part of a rear wheel house along a rear wall part, and a rear pillar reinforcement extends upward from the top part of the rear wheel house along a side wall part up to a rear pillar (see Patent Literature 3, for example). In this vehicle body rear structure, the rigidity and strength of the rear wheel house can be ensured by reinforcing the rear wheel house with the linking gusset and the rear pillar reinforcement.

To comply with the demand to further increase the rigidity and strength of the rear wheel house, it is conceivable to cause loads to be transferred from the top part of the rear wheel house to the rear parcel. The rear parcel is usually provided to a vehicle body rear structure as a member for partitioning the trunk and the passenger compartment.

Recently rear parcels have tended to be placed in a high position in order to guarantee a larger trunk space of a vehicle body rear structure. Locating the rear parcel in a high position causes the rear parcel to be set comparatively far from the rear wheel house. It is therefore difficult to further improve the rigidity and strength of the rear wheel house (i.e. the vehicle body rear part) due to the fact that loads are transferred from the top part of the rear wheel house to the rear parcel.

PRIOR ART LITERATURE

Patent Literature

Patent Literature 1: JP H09-240510A
Patent Literature 2: JP H11-348826A
Patent Literature 3: JP 2006-69268A

SUMMARY OF INVENTION

Technical Problem

The present invention addresses the problem of providing a vehicle body rear structure whereby a load can be efficiently transferred between a vehicle body side part and a closed cross section (a rear parcel).

The present invention also addresses the problem of providing a vehicle body rear structure whereby the rigidity and strength of a damper base can be sufficiently increased.

The present invention also addresses the problem of providing a vehicle body rear structure whereby the rigidity and strength of a vehicle body rear part can be improved.

Solution to Problem

According to an aspect of the present invention, there is provided a vehicle body rear structure comprising: a pair of vehicle body side parts configured from rear wheel houses and rear pillars, and provided a predetermined gap apart in a lateral direction; a rear parcel provided between the pair of vehicle body side parts and adapted to partition a trunk and a passenger compartment; a parcel cross member that is bonded to the underside of the rear parcel, and that together with the rear parcel constitutes a first closed cross section extending laterally; and rear parcel members and parcel supports that are bonded to the first closed cross section and constitute main sections of second closed cross sections continuing from the first closed cross section to the vehicle body side parts.

In a preferred form, each rear wheel house includes a damper base in the top part, and the damper base constitutes a part of the second closed cross section.

In another preferred form, the rear parcel has a top surface vertically partitioning the trunk and the passenger compartment, and a front surface hanging down from the top surface; the parcel cross member has a bottom surface facing the top surface, and a rear surface facing the front surface; the first closed cross section is configured from the top surface and the front surface of the rear parcel, and the bottom surface and the rear surface of the parcel cross member; and the second closed cross sections are configured from the rear parcel members continuing into laterally outer sides of the rear surface, the parcel supports continuing into the top surface and the front surface, and the damper bases continuing into the bottom surface.

In a further preferred form, each parcel support includes: a first support member having a first surface continuing into the top surface, and a second surface hanging down from a front end of the first surface and bonded at a bottom end to the vertical middle of the rear parcel member; and a second support member having a third surface extending forward from the bottom end of the second surface, and a fourth surface hanging down from a front end of the third surface and bonded to the damper base; and each second closed cross section includes a top closed cross section configured from the rear parcel member and the first support member, and a bottom closed cross section configured from the rear parcel member, the second support member, and the damper base.

In a still further preferred form, the rear parcel has a first ridge line between the top surface and the front surface, and each second support member has a second ridge line between the third surface and the fourth surface, the second ridge line continuing into the first ridge line and extending laterally outward.

In a still further preferred form, each second support member has a work hole in the third surface through which the damper base can be viewed.

In a still further preferred form, bulkheads are provided for partitioning the first closed cross section and the second closed cross sections.

In a still further preferred form, the vehicle body rear structure further comprises parcel shelf supports for linking laterally inner end parts of the damper bases and laterally outer end parts of the bottom surface in the parcel cross member, and each parcel shelf support constitutes a part of a second closed cross section.

In a still further preferred form, the rear wheel houses have damper bases in the top parts, the rear parcel has a top surface vertically partitioning the trunk and the passenger compartment and a front surface hanging down from a front end of the top surface, the parcel cross member has a bottom surface facing the top surface and a rear surface facing the front surface; and the vehicle body rear structure comprises rear parcel members linking the rear pillars and the laterally outer end parts of the rear surface, parcel shelf supports linking the damper bases and the laterally outer end parts of the bottom surface, and damper supports provided to the top parts of the damper bases and bonded to the rear parcel members and the parcel shelf supports.

In a still further preferred form, the vehicle body rear structure further comprises first support members bonded to the rear parcel members and constituting top closed cross sections together with the rear parcel members, the top closed cross sections are linked so as to continue into the first closed cross section, and the damper supports are superimposed on the rear parcel members and the first support members, in which state the three members are bonded together.

In a still further preferred form, the vehicle body rear structure further comprises second support members bonded to the rear parcel members and the damper bases and constituting bottom closed cross sections together with the first closed cross section, the bottom closed cross sections are linked so as to continue into the first closed cross section, and the damper supports are superimposed on the rear parcel members and the second support members, in which state the three members are bonded together.

In a still further preferred form, the vehicle body rear structure further comprises first support members bonded to the rear parcel members and constituting top closed cross sections together with the rear parcel members, and second support members bonded to the rear parcel members and the damper bases and constituting bottom closed cross sections together with the first closed cross section; the top closed cross sections and the bottom closed cross sections are linked so as to continue into the first closed cross section; protruding flanges arranged alternatingly in the lateral direction are provided to both the first support members and the second support members; the damper supports are superimposed on the rear parcel members and the protruding flanges of the first support members, in which state the three members are bonded together; and the damper supports are superimposed on the rear parcel members and the protruding flanges of the second support members, in which state the three members are bonded together.

In a still further preferred form, the rear wheel houses have damper bases in the top parts, and the vehicle body rear structure comprises rear parcel members linking the parcel cross member and the rear pillars and bonded at the bottom ends to the damper bases, and rear wheel house patches bonded so as to extend along the rear wheel houses and bonded at the top ends to the rear parcel members.

In a still further preferred form, each damper base has a damper support surface part and a base flange extending downward from a peripheral edge of the damper support surface part, a rear wheel house being bonded to the base flange; each rear parcel member has a first bonding part bonded to the base flange, and a first extending part extending lower than the first bonding part; and the first extending part is superimposed on the rear wheel house patch and the rear wheel house, in which state the three members are bonded together.

In a still further preferred form, in each rear parcel member the first bonding parts and exposure holes through which the damper base or the rear wheel house is exposed are alternatingly arranged in the lateral direction; each rear wheel house patch has a second bonding part bonded to the rear wheel house, and second extending parts extending higher than the second bonding part and exposed through the exposure holes; and the second extending parts are superimposed on the base flange and the rear wheel house, in which state the three members are bonded together.

In a still further preferred form, each rear wheel house includes a U-shaped cross section formed by a side wall facing toward the lateral center, a front wall extending laterally outward from a front end of the side wall, and a rear wall extending laterally outward from a rear end of the side wall; and each rear wheel house patch has an extending reinforcing part provided along a ridge line between the side wall and the rear wall and extending laterally outward from the longitudinal middle of the ridge line.

Advantageous Effects of Invention

In one preferred form, the first closed cross section is configured (formed) from the rear parcel and the parcel cross member, and the main sections of the second closed cross sections are configured from the rear parcel members and the parcel supports. Furthermore, the second closed cross sections are made to continue from the first closed cross section to the vehicle body side parts. Thus, including the first closed cross section and the second closed cross sections enables loads to be suitably (efficiently) transferred between the vehicle body side parts and the rear parcel, and the rigidity and strength of the vehicle body rear part can therefore be improved.

In another preferred form, a part of each second closed cross section is configured from the damper base included in the top part of the rear wheel house. Providing the damper base to the top part of the rear wheel house, which has comparatively high rigidity and strength, can increase the rigidity and strength of the damper base. The rigidity and strength of second closed cross section can thereby be increased by configuring a part of the second closed cross section from the damper base.

In a further preferred form, the damper bases are made to continue into the bottom surface of the parcel cross member. Consequently, when a load of the first closed cross section (the parcel cross member) is transferred to the second closed cross sections (the damper bases), the transferred load can be transferred through the damper bases to the rear wheel houses which have comparatively high rigidity and strength. The transferred load can thereby be suitably supported by the rear wheel houses, and the rigidity and strength of the vehicle body rear part can therefore be further improved.

In a still further preferred form, the second closed cross sections are configured from the top closed cross sections and the bottom closed cross sections, and the top surfaces of the bottom closed cross sections are formed from the third surfaces of the second support members. The third surfaces of the second support members extend forward from the bottom ends of the second surfaces. Spaces can thereby be ensured above the bottom closed cross sections, and these spaces can be utilized to attach the dampers (shock absorbers) to the top parts of the rear wheel houses.

Furthermore, the top closed cross sections and the bottom closed cross sections constituting the second closed cross sections are provided as being continuous between the first closed cross section and the vehicle body side parts. Loads can thereby be suitably (efficiently) transferred between the vehicle body side parts and the rear parcel, and the rigidity and strength of the vehicle body rear part can therefore be improved.

In a still further preferred form, the rear parcel has a first ridge line, and the second support members have second ridge lines. Loads can thereby be transferred more suitably (efficiently) through the first ridge line and the second ridge lines, and the rigidity and strength of the vehicle body rear part can therefore be improved.

In a still further preferred form, work holes are provided in the third surfaces of the second support members, whereby the damper bases can be viewed (observed) through the work holes. The assembly work of attaching the dampers to the top parts of the rear wheel houses can thereby be made easier, as can the work of adjusting the dampers (tuning work).

In a still further preferred form, the rigidity and strength between the first closed cross section and the second closed cross sections can be further increased by providing the bulkheads partitioning the first closed cross section and the second closed cross sections. Loads can thereby be transferred more suitably (efficiently) between the vehicle body side parts and the rear parcel, and the rigidity and strength of the vehicle body rear part can therefore be improved.

In a still further preferred form, the laterally inner end parts of the damper bases and the laterally outer end parts of the parcel cross member (the bottom surface) are linked by the parcel shelf supports. A part of each second closed cross section is configured from a parcel shelf support. Consequently, the second closed cross sections can be linked to the first closed cross section even if the rear parcel is provided higher than the damper bases. Loads can thereby be suitably (efficiently) transferred between the vehicle body side parts and the rear parcel, and the rigidity and strength of the vehicle body rear part can therefore be improved.

In a still further preferred form, the rear parcel members are linked to the rear surface of the parcel cross member and the rear pillars, and the parcel shelf supports are linked to the bottom surface of the parcel cross member and the damper bases. Furthermore, the damper supports can be firmly supported by bonding the damper supports to the rear parcel members and the parcel shelf supports. The rigidity and strength of the damper bases can be sufficiently increased with the damper supports by providing the damper supports to the top parts of the damper bases.

Attaching the top parts of the dampers (shock absorbers) to the damper supports and the damper bases causes loads to be transferred from the top parts of the dampers to the damper bases and the damper supports. Because the rigidity and strength of the damper bases is sufficiently increased, transferred loads are efficiently transferred to the rear pillars and the rear parcel via two members: the rear parcel members and the parcel shelf supports. The loads transferred from the top parts of the dampers to the damper supports and the damper bases can thereby be suitably supported by the rear pillars and the rear parcel.

In a still further preferred form, the damper supports are superimposed on the rear parcel members and the first support members, in which state the three members are bonded together. Consequently, a large plate thickness dimension can be ensured in the parts where these three members are bonded, and the rear parcel members, the first support members, and the damper supports can therefore be firmly bonded together. The rigidity and strength of the vehicle body rear part can therefore be improved by increasing the bonding strength of the parts where the three members are bonded.

In a still further preferred form, the damper supports are superimposed on the rear parcel members and the second support members, in which state the three members are bonded together. Consequently, a large plate thickness dimension can be ensured in the parts where these three members are bonded, and the rear parcel members, the second support members, and the damper supports can therefore be firmly bonded together. The rigidity and strength of the vehicle body rear part can therefore be improved by increasing the bonding strength of the parts where the three members are bonded.

In a still further preferred form, protruding flanges are provided to the first support members and the second support members, and the protruding flanges of the support members are arranged alternatingly in the lateral direction. Consequently, the protruding flanges of the first support members are superimposed on the rear parcel members and the damper supports, in which state the three members are bonded together, and a large plate thickness dimension can therefore be ensured in the parts where the three members are bonded. The rear parcel members, the damper supports, and the protruding flanges of the first support members can thereby be firmly bonded together, and the bonding strength of the parts where the three members are bonded can therefore be increased.

Furthermore, the protruding flanges of the second support members are superimposed on the rear parcel members and the damper supports, in which state the three members are bonded together, and a large plate thickness dimension can therefore be ensured in the parts where the three members are bonded. The rear parcel members, the damper supports, and the protruding flanges of the second support members can thereby be firmly bonded together, and the bonding strength of the parts where the three members are bonded can therefore be increased.

In a case in which, for example, the first support members and the second support members are superimposed on the rear parcel members and the damper supports to bond the four members together, the plate thickness dimension would be too big in the parts where the four members are bonded, and it would be difficult to reliably bond the members together. In view of this, in the invention according to the twelfth aspect, the protruding flanges of the first support members and the second support members are arranged alternatingly in the lateral direction. The first support members and the second support members can thereby both be reliably bonded to the rear parcel members and the damper supports, and the rigidity and strength of the vehicle body rear part can therefore be improved.

In a still further preferred form, linking the parcel cross member and the rear pillars with the rear parcel members enables loads to be efficiently transferred between the parcel cross member (i.e. the rear parcel) and the rear pillars. Furthermore, rear wheel house patches are bonded along the rear wheel houses, and the top ends of the rear wheel house patches are bonded to the rear parcel members. Consequently, loads can be efficiently transferred between the rear wheel houses and the rear parcel members.

Thus, linking the parcel cross member and the rear pillars with the rear parcel members, and bonding the top ends of the rear wheel house patches to the rear parcel members, can improve the rigidity and strength of the vehicle body rear part. Loads can thereby be efficiently transferred between the rear wheel houses, the rear parcel, and the rear pillars.

In a still further preferred form, the first extending parts of the rear parcel members are superimposed on the rear wheel house patches and the rear wheel houses to bond the three members together. Consequently, a large plate thickness dimension can be ensured in the parts where these three members are bonded, and the first extending parts, the rear wheel house patches, and the rear wheel houses can therefore be firmly bonded together. The bonding strength of the parts where these three members are bonded can thereby be increased, and the rigidity and strength of the vehicle body rear part can thereby be improved.

In a still further preferred form, the second extending parts of the rear wheel house patches are superimposed on the base flanges and the rear wheel houses to bond the three members together. Consequently, a large plate thickness dimension can be ensured in the parts where these three members are bonded, and the second extending parts, the base flanges, and the rear wheel houses can therefore be firmly bonded together. The bonding strength of the parts where these three members are bonded can thereby be increased, and the rigidity and strength of the vehicle body rear part can thereby be improved.

In a still further preferred form, the rear wheel house patches are provided along the ridge lines of the rear wheel houses. The ridge lines are sections of the rear wheel houses that have comparatively high rigidity. The rear wheel houses can thereby be suitably (effectively) reinforced by providing the rear wheel house patches along the ridge lines.

Reinforcing the ridge lines of the rear wheel houses with the rear wheel house patches increases the difference in strength with other sections of the rear wheel houses. Stress concentrates in sections that differ greatly in strength, which is thought to cause bending in the rear wheel houses. In view of this, the extending reinforcing parts are extended laterally outward (toward the sides of the vehicle body) from the longitudinal middles of the rear wheel house patches.

Consequently, reinforcing other sections of the rear wheel houses with the extending reinforcing parts can minimize the difference in strength between the ridge lines of the rear wheel houses and the other sections. Stress concentration due to loads imposed on the rear wheel houses can thereby be minimized, imposed loads can be dispersed to the vehicle body side parts via the extending reinforcing parts, and the rigidity and strength of the rear wheel houses (i.e. the vehicle body rear part) can therefore be increased.

DESCRIPTION OF EMBODIMENTS

The preferred embodiments of the present invention are described below with reference to the attached drawings. The terms "front (Fr)," "rear (Rr)," "left (L)," and "right (R)" refer to directions from the perspective of the driver.

Embodiments

Figure 1:
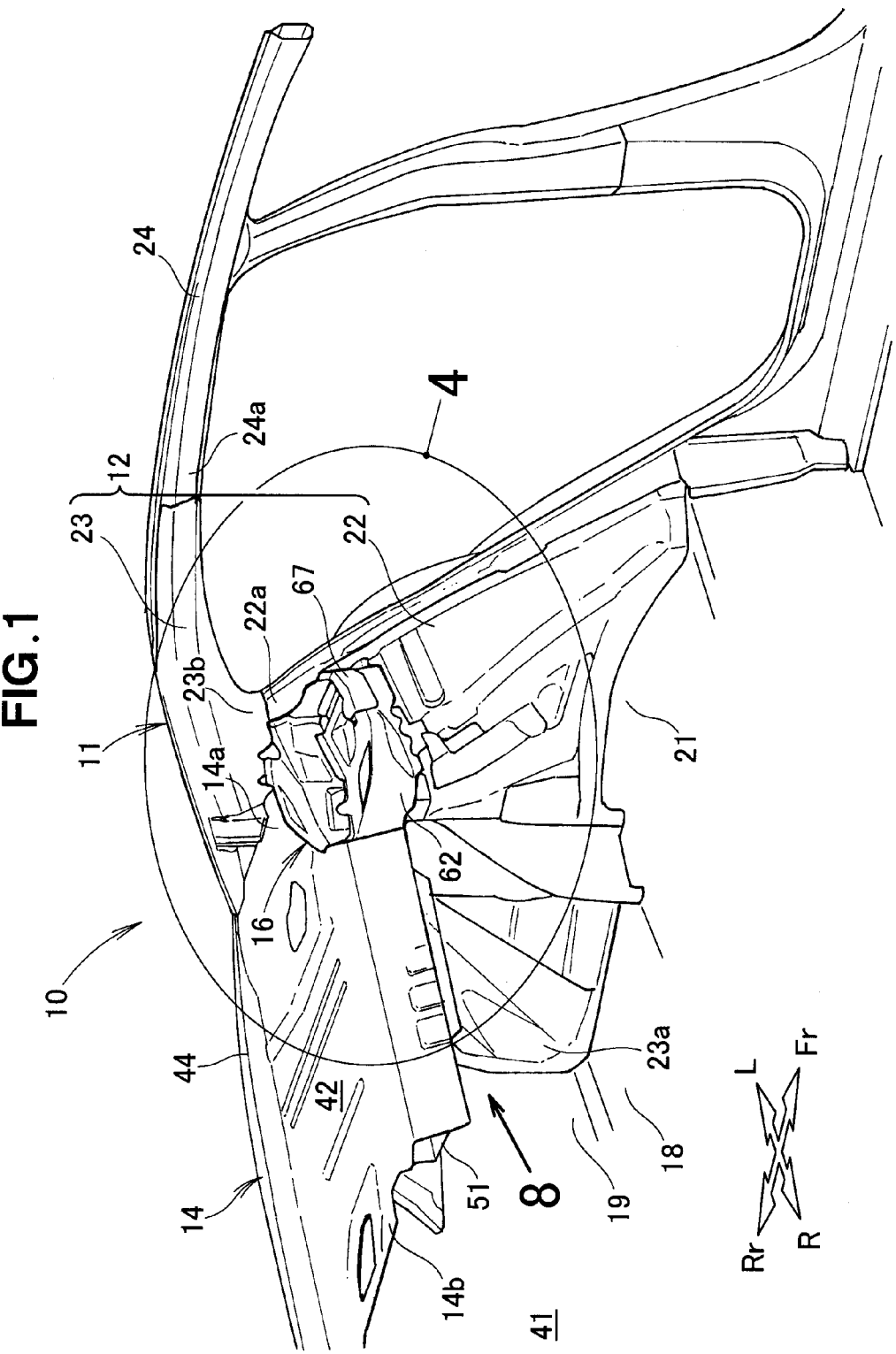
FIG. 1 is a perspective view of the vehicle body rear structure according to the present invention as seen from within the passenger compartment.

As shown in FIG. 1, a vehicle body rear structure 10 includes left and right vehicle body side parts (a pair of vehicle body side parts, the right vehicle body side part is not shown) 12 provided a predetermined gap apart in the lateral direction of a vehicle body rear part 11, a rear parcel unit 14 provided between the left and right vehicle body side parts 12, a left support unit 16 for supporting a left end 14a of the rear parcel unit 14, and a right support unit (not shown) for supporting a right end 14b of the rear parcel unit 14.

The left and right vehicle body side parts 12 are bilaterally symmetrical members, and the left vehicle body side part 12 is described in detail below without describing the right vehicle body side part. The left and right support units 16 are bilaterally symmetrical members, and the left support unit 16 is described in detail below without describing the right support unit.

The left vehicle body side part 12 includes a left rear wheel house (a rear wheel house) 22 provided to a left rear side frame 21, and a left rear pillar (a rear pillar) 23 provided to a top part 22a of the left rear wheel house 22.

Figure 2:
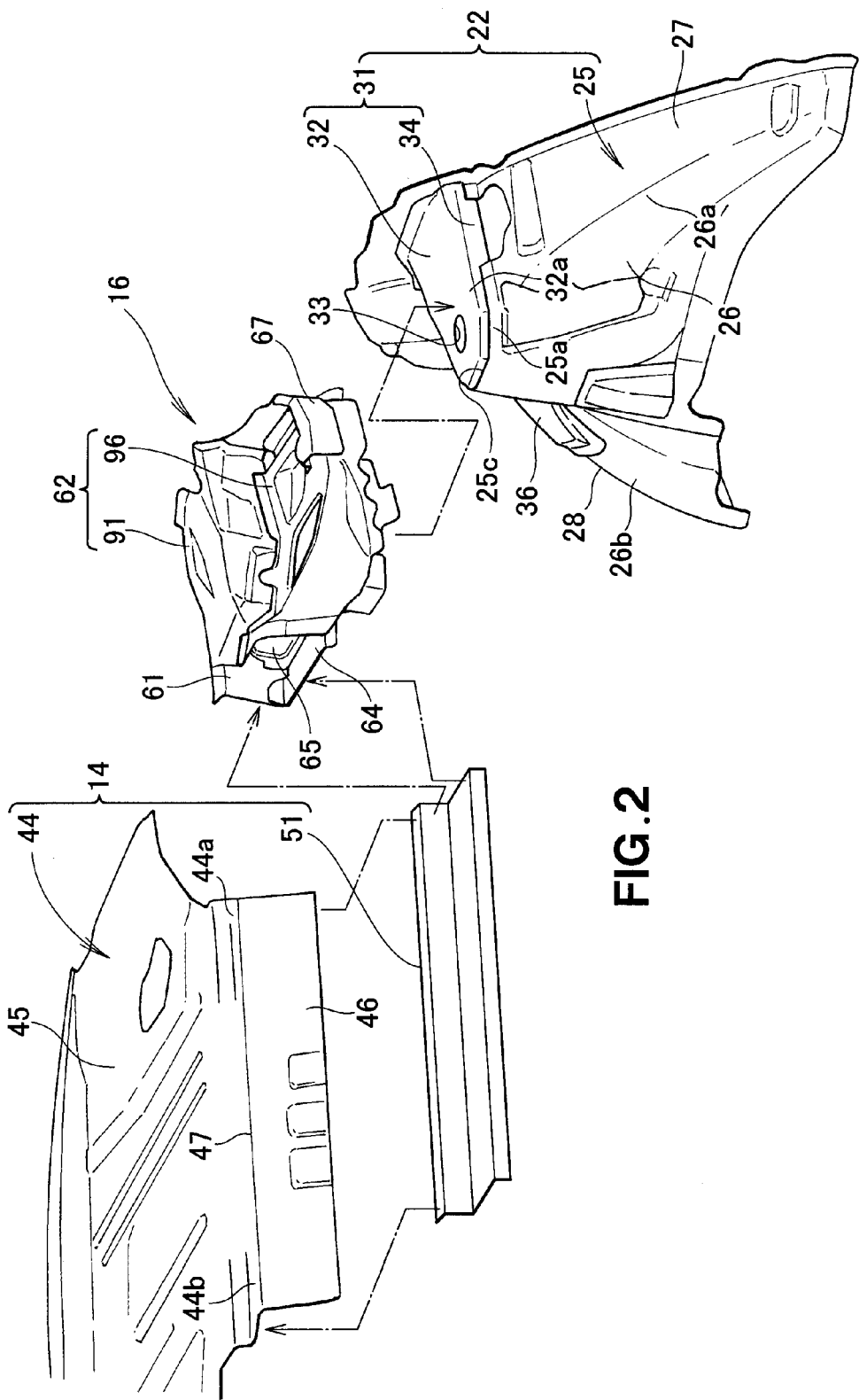
FIG. 2 is an exploded perspective view of the left support unit and rear parcel unit as having been disassembled from the vehicle body rear structure of FIG. 1.

As shown in FIG. 2, the left rear wheel house 22 includes a wheel house body 25 capable of accommodating a left rear wheel or a left damper (a shock absorber), and a damper base 31 provided to the top part of the wheel house body 25.

The wheel house body 25 has a wheel side wall (a side wall) 26 facing toward the lateral center, a wheel front wall (a front wall) 27 extending laterally outward from a front end 26a of the wheel side wall 26, and a wheel rear wall (a rear wall) 28 (see also FIG. 8) extending laterally outward from a rear end 26b of the wheel side wall 26. This wheel house body 25 includes a U-shaped cross section formed into a substantial U shape in horizontal cross section by the wheel side wall 26, the wheel front wall 27, and the wheel rear wall 28. Including the U-shaped cross section in the wheel house body 25 enables the wheel house body 25 (i.e. the left rear wheel house 22) to be formed into a member of comparatively high rigidity and strength.

The damper base 31 has a damper support surface part (the top part) 32 covering a top opening of the left rear wheel house 22, and a base flange 34 extending (protruding) downward from a peripheral edge 32a of the damper support surface part 32. Formed in the damper support surface part 32 is a damper attachment hole 33 for attaching the top part of a damper (the shock absorber) (not shown). The base flange 34 is bonded to an inner peripheral wall 25b (see FIG. 6) of the wheel house body 25 (the top part 25a). Bonding the base flange 34 to the inner peripheral wall 25b of the top part 25a causes a top opening 25c of the wheel house body 25 to be blocked by the damper support surface part 32.

The top part of the damper (not shown) is attached to the damper support surface part 32 of the damper base 31. This damper is stowed in the space inside the left rear wheel house 22. A wheel house patch (a rear wheel house patch) 36 (see also FIG. 5) is bonded along the rear part (the wheel side wall 26 and the wheel rear wall 28) of the wheel house body 25. The wheel house patch 36 is described in detail hereinafter.

As shown in FIG. 1, the left rear pillar 23 is provided so as to extend rearward and downward in the vehicle body from a rear end 24a of a left roof side rail 24. Furthermore, a bottom end 23a of the left rear pillar 23 is bonded to a floor 18 and a rear panel 19. A substantially middle part 23b of the left rear pillar 23 is provided to the top part 22a of the left rear wheel house 22.

As shown in FIGS. 1 and 2, the rear parcel unit 14 is provided between the left and right vehicle body side parts 12 and above the left and right rear wheel houses 22. Consequently, the left and right end parts of the rear parcel unit 14 are provided respectively to the left and right rear wheel houses 22 via the left and right support units 16. The rear parcel unit 14 includes the rear parcel 44 partitioning a trunk 41 and a passenger compartment 42, and the parcel cross member 51 bonded to the bottom of the front side (below) the rear parcel 44.

The rear parcel 44 is provided between the left and right vehicle body side parts 12 and above the left and right rear wheel houses 22, a left end 44a is bonded to the left vehicle body side part 12, and a right end 44b is bonded to the right vehicle body side part. The rear parcel 44 has a top surface panel (the top surface) 45 vertically partitioning the trunk 41 and the passenger compartment 42, and a front surface wall (the front surface) 46 hanging down from the front side of the top surface panel 45. Furthermore, the rear parcel 44 is formed into a substantial L shape in cross section by the top surface panel 45 and the front surface wall 46. Forming the top surface panel 45 and the front surface wall 46 into a substantial L shape in cross section causes a first ridge line 47 to be formed between the top surface panel 45 and the front surface wall 46. The first ridge line 47 is an angled part formed so as to protrude forward in the vehicle body.

Figure 3:
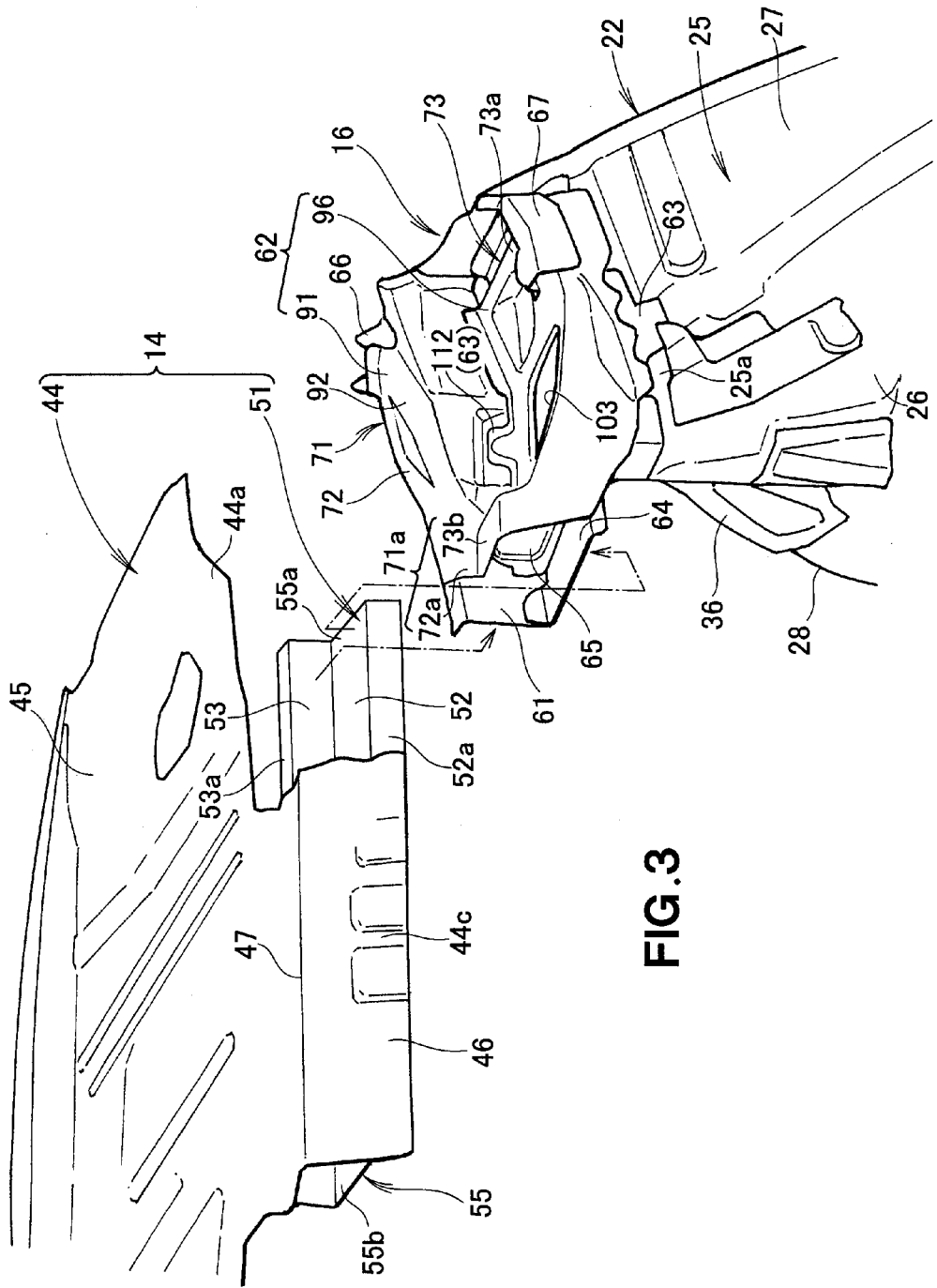
FIG. 3 is an exploded perspective view of the rear parcel unit as having been disassembled from the vehicle body rear structure of FIG. 1.

As shown in FIG. 3, the parcel cross member 51 has a bottom surface part (the bottom surface) 52 facing the top surface panel 45 of the rear parcel 44, and a rear surface wall (the rear surface) 53 facing the front surface wall 46 of the rear parcel 44. The parcel cross member 51 is formed into a substantial L shape in cross section by the bottom surface part 52 and the rear surface wall 53.

A top side 53a of the rear surface wall 53 is bonded to the back surface of the top surface panel 45, and a front side 52a of the bottom surface part 52 is bonded to the bottom side (back surface) of the front surface wall 46. A first closed cross section 55, substantially rectangular in cross section, is thereby formed by the rear parcel 44 (i.e. the top surface panel 45 and the front surface wall 46) and the parcel cross member 51 (i.e. the bottom surface part 52 and the rear surface wall 53).

The first closed cross section 55, which extends laterally in a front part 44c of the rear parcel 44, is provided between the left and right vehicle body side parts 12 (only the left vehicle body side part 12 is shown in FIG. 1). A left end 55a of the first closed cross section 55 is supported by the left support unit 16, and a right end 55b is supported by the right support unit (not shown).

Figure 4:
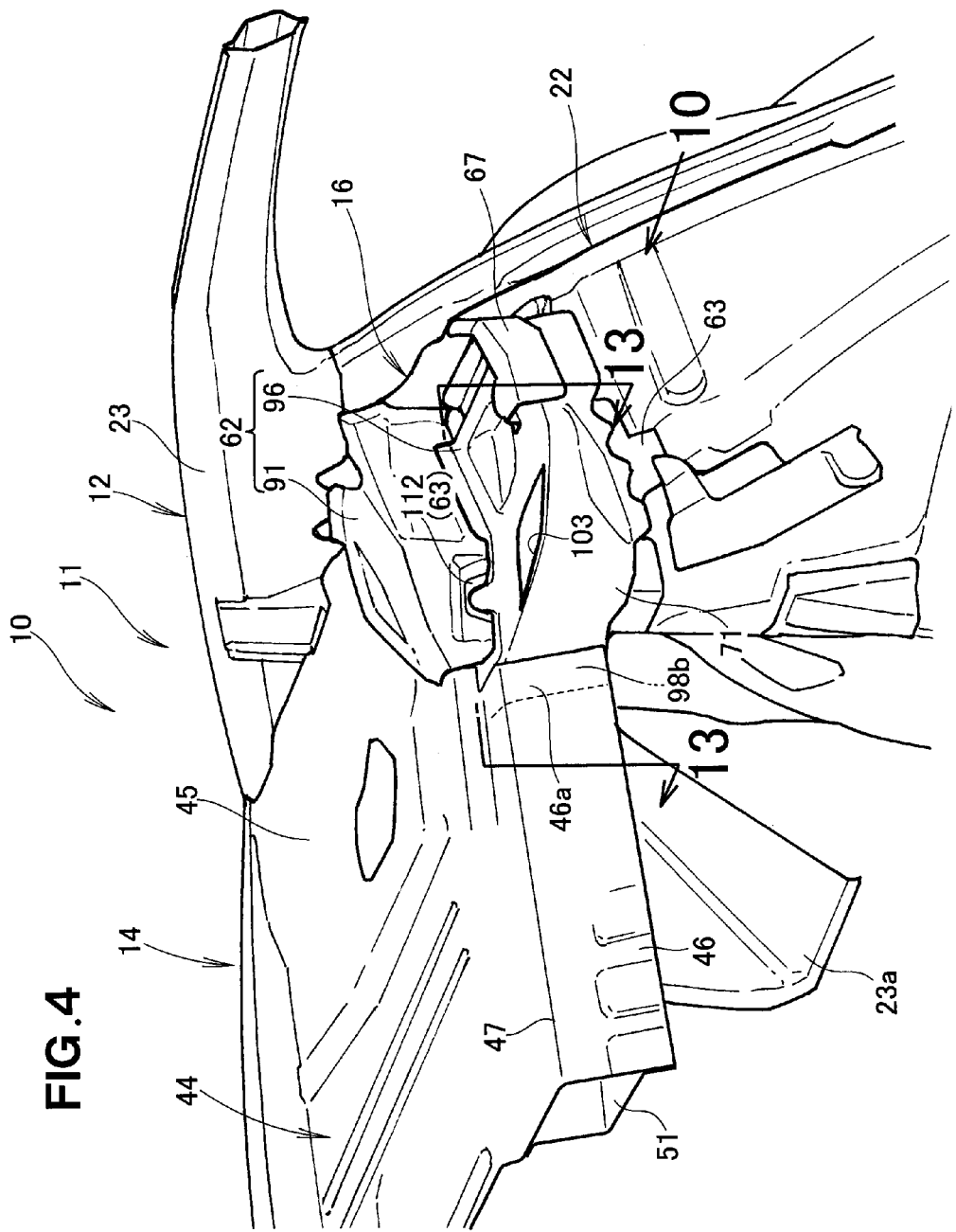
FIG. 4 is an enlarged view of section 4 of FIG. 1.
Figure 5:
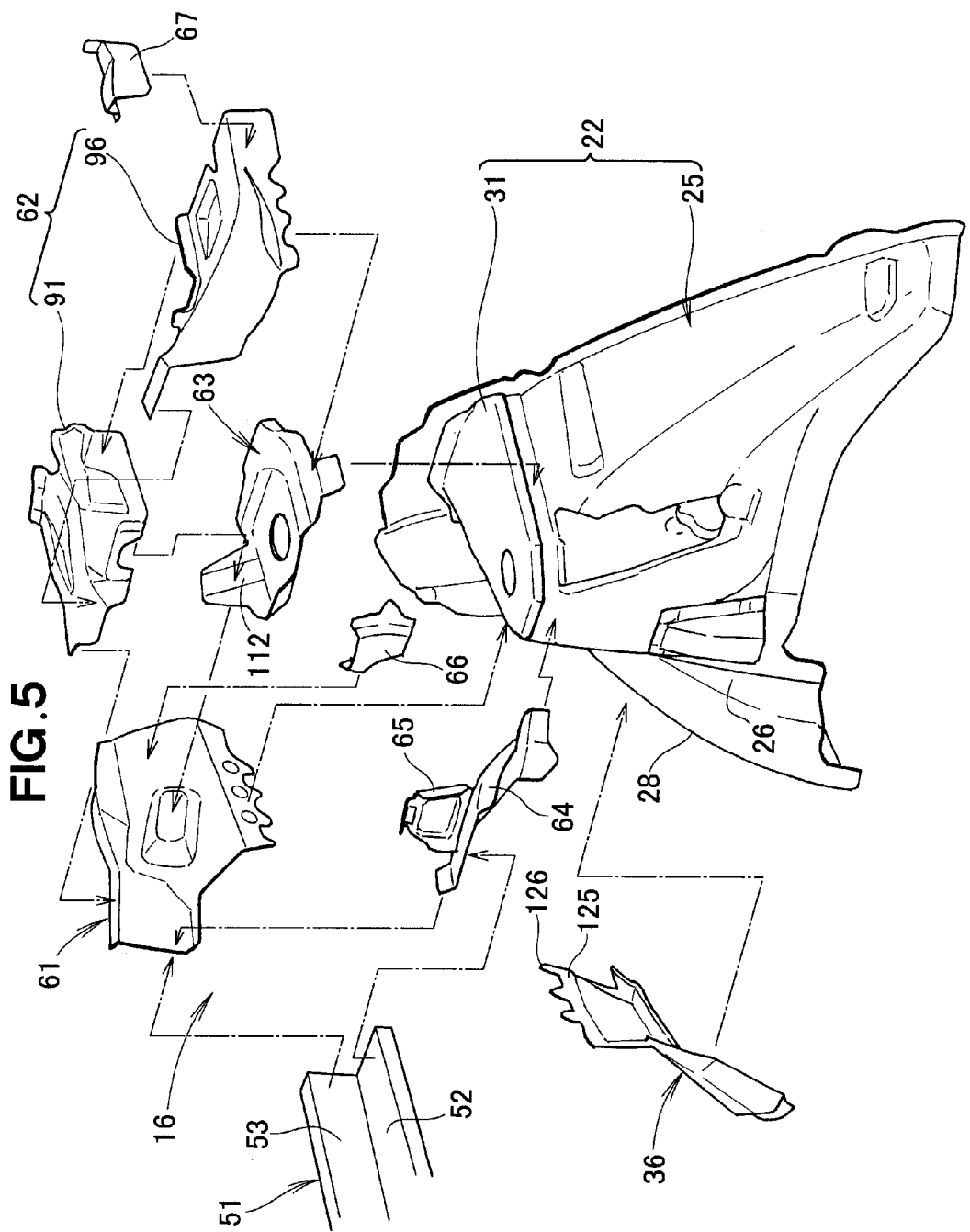
FIG. 5 is an exploded perspective view of the left support unit of FIG. 2 as having been disassembled.

As shown in FIGS. 3 to 5, the left support unit 16 includes a parcel member (a rear parcel member) 61 which continues into the rear surface wall 53 of the parcel cross member 51, a parcel support 62 which continues into the rear parcel 44, and a damper support 63 which continues into the parcel support 62.

Furthermore, the left support unit 16 includes a parcel shelf support 64 linking the damper base 31 and the parcel cross member 51, an inner bulkhead (a bulkhead) 65 provided to the parcel shelf support 64, an outer bulkhead 66 provided to the parcel member 61 and the parcel support 62, and a wheel house gusset 67 linking the parcel support 62 and the left rear wheel house 22.

Figure 6:
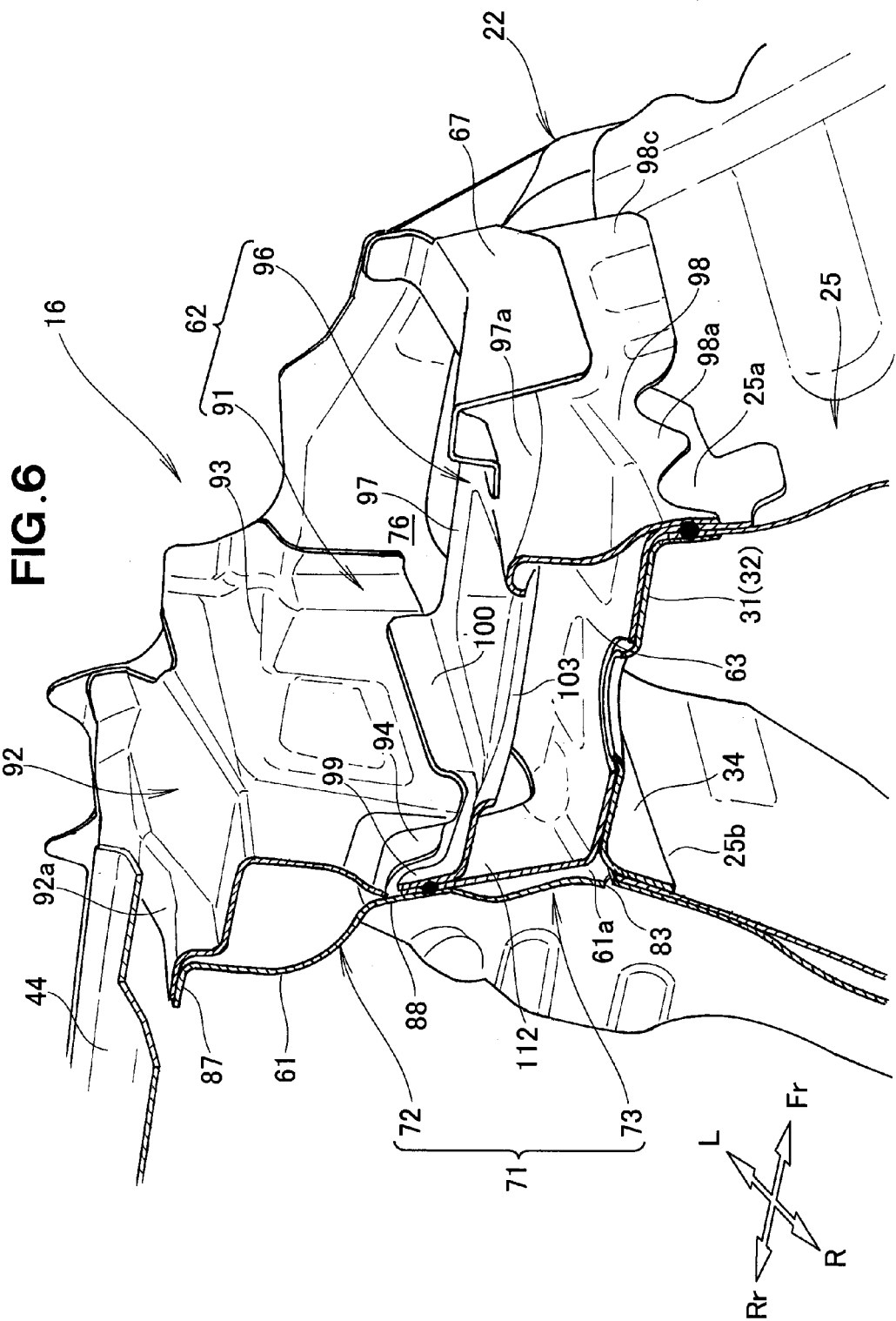
FIG. 6 is a cross-sectional view taken along line 6-6 of FIG. 10.

Additionally, as shown in FIGS. 3 and 6, the left support unit 16 includes a second closed cross section 71 formed by the parcel member 61, the parcel support 62, the damper base 31, and the parcel shelf support 64. The parcel member 61 and the parcel support 62 herein are members constituting the main section of the second closed cross section 71. The damper base 31 and the parcel shelf support 64 are members constituting part of the second closed cross section 71.

The following effects are achieved by configuring part of the second closed cross section 71 from the damper base 31. Specifically, the damper base 31 is provided to the top part 25a of the wheel house body 25. The wheel house body 25 (i.e. the left rear wheel house 22) is a member of comparatively high rigidity and strength. Consequently, providing the damper base 31 to the top part 25a of the wheel house body 25, which has comparatively high rigidity and strength, can increase the rigidity and strength of the damper base 31. The rigidity and strength of the second closed cross section 71 can thereby be increased by configuring part of the second closed cross section 71 from the damper base 31.

Next, the second closed cross section 71 will be described in detail. The second closed cross section 71, which is bonded to the lateral left end 55a of the first closed cross section 55, is a region that continues from the left end 55a of the first closed cross section 55 to the left vehicle body side part 12 (the left rear wheel house 22). The second closed cross section 71 includes a top closed cross section 72 provided rearward in the vehicle body, and a bottom closed cross section 73 provided forward in the vehicle body from the top closed cross section 72. Forming both the top closed cross section 72 and the bottom closed cross section 73 as closed cross sections increases their rigidity and strength. Consequently, the second closed cross section 71 configured from the top closed cross section 72 and the bottom closed cross section 73 has increased rigidity and strength.

The top closed cross section 72 is provided rearward in the vehicle body from the bottom closed cross section 73 and above the bottom closed cross section 73. The top closed cross section 72 is configured as a closed cross section by the parcel member 61 and the parcel support 62 (specifically, a first support member 91 (described hereinafter)). The bottom closed cross section 73 is provided forward in the vehicle body from the top closed cross section 72, and below the top closed cross section 72. The bottom closed cross section 73 is configured from the parcel member 61, the parcel support 62 (specifically, a second support member 96 (described hereinafter)), and the damper base 31.

The bottom closed cross section 73 is formed into an upward slope from an outer end 73a on the laterally outer side toward an inner end 73b on the laterally inner side. Consequently, the laterally inner end 73b of the bottom closed cross section 73 is located at the same height as a laterally inner end 72a of the top closed cross section 72. An inner end 71a of the second closed cross section 71 is thereby formed by the laterally inner end 73b of the bottom closed cross section 73 and the laterally inner end 72a of the top closed cross section 72.

The inner end 71a of the second closed cross section 71 is formed in a substantially rectangular closed cross section (see FIG. 3), and is linked when stowed to the laterally outer left end 55a of the first closed cross section 55. Specifically, the second closed cross section 71 is linked so as to continue laterally outward from the laterally outer left end 55a of the first closed cross section 55.

Thus, the first closed cross section 55 is configured (formed) from the rear parcel 44 and the parcel cross member 51, and the main section of the second closed cross section 71 is configured from the parcel member 61 and the parcel support 62. Furthermore, the second closed cross section 71 is made to continue from the first closed cross section 55 to the left rear wheel house 22.

The top closed cross section 72 and the bottom closed cross section 73 (i.e. the second closed cross section 71) are regions of high rigidity and strength. Furthermore, the left rear wheel house 22 and the rear parcel 44 are linked together by the second closed cross section 71. Loads can thereby be suitably (efficiently) transferred between the left rear wheel house 22 and the rear parcel 44 via the second closed cross section 71, and the rigidity and strength of the vehicle body rear part 11 is therefore improved.

Furthermore, the top closed cross section 72 and the bottom closed cross section 73 constituting the second closed cross section 71 are provided as being continuous between the first closed cross section 55 and the left vehicle body side part 12. Loads can thereby be suitably (efficiently) transferred between the left vehicle body side part 12 and the rear parcel 44 via the second closed cross section 71, and the rigidity and strength of the vehicle body rear part 11 (see FIG. 4) can therefore be improved.

The second closed cross section 71 is configured from the top closed cross section 72 and the bottom closed cross section 73, and the top surface of the bottom closed cross section 73 is formed from a third surface part 97 of the second support member 96. The third surface part 97 of the second support member 96 extends forward from a bottom end 93a (FIG. 7) of a second surface part 93. Consequently, a space 76 can be ensured above the bottom closed cross section 73. The space 76 above the bottom closed cross section 73 can thereby be utilized to attach the top part of the damper (the shock absorber) to the top part 22a (the damper support surface part 32) of the left rear wheel house 22.

Next, the members constituting the second closed cross section 71 shall be described in detail.

Figure 7:
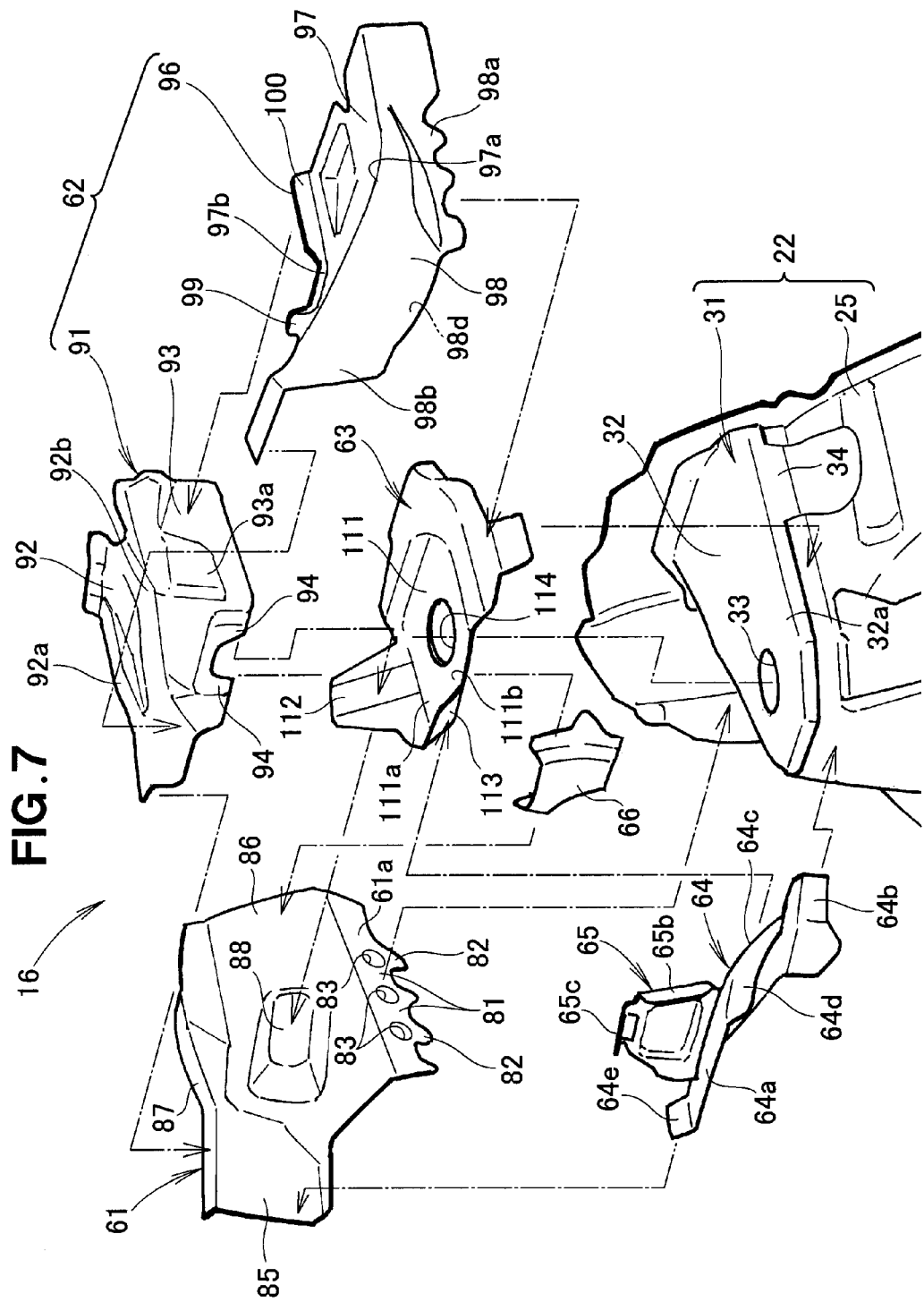
FIG. 7 is an enlarged view of the main section of FIG. 5.
Figure 8:
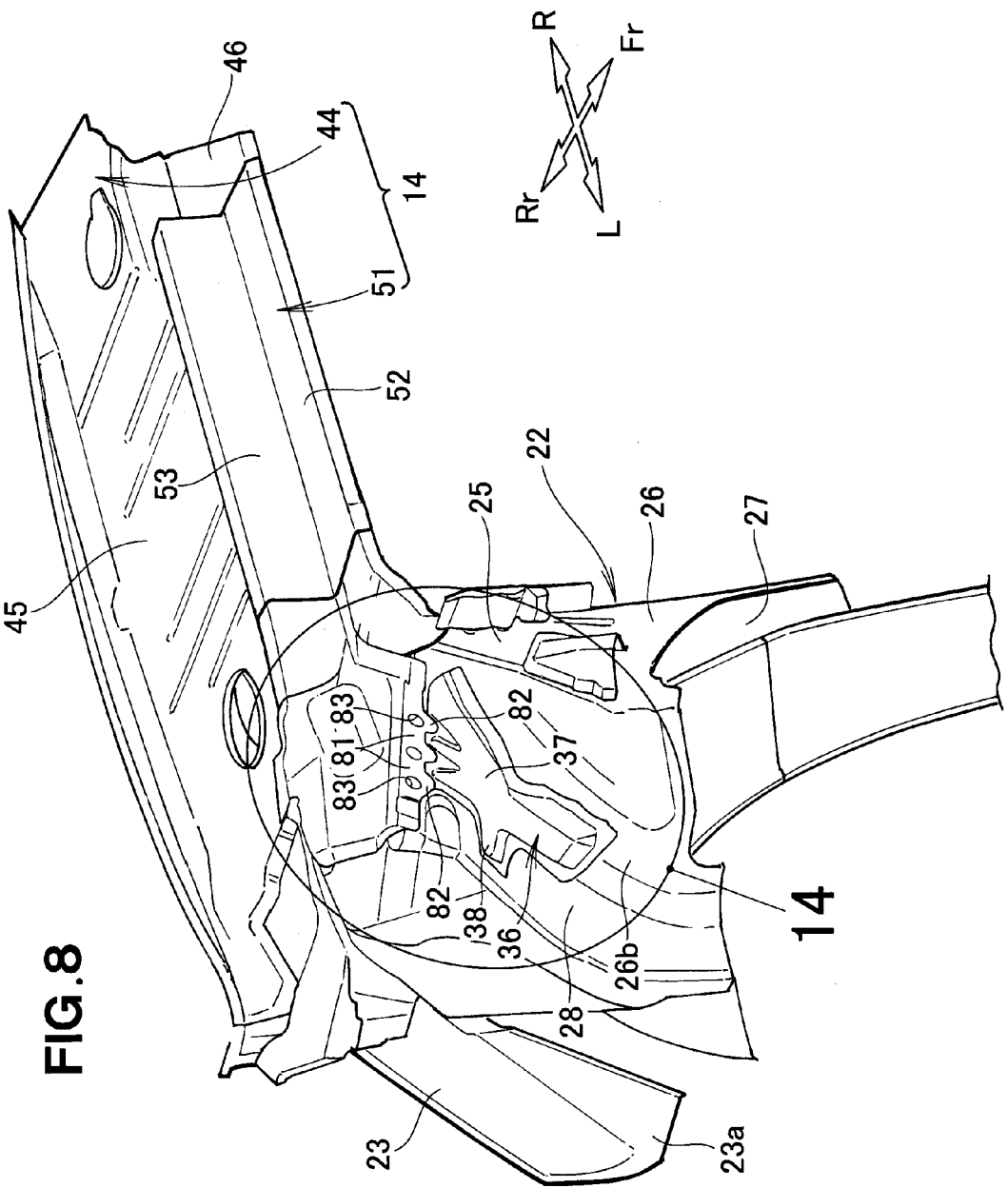
FIG. 8 is a view as indicated by the arrow 8 of FIG. 1.

As shown in FIGS. 7 and 8, the parcel member 61 is formed into a substantially square shape as seen from the side, and is arranged substantially vertically due to the bottom end 61a being bonded to the damper base 31 from the rear of the vehicle body. The bottom end 61a of the parcel member 61 has a plurality of first bonding parts 81, a plurality of first extending parts 82, and a plurality of exposure holes 83.

The first bonding parts 81 are sections that are made to protrude downward in the bottom end 61a, and bonded to the base flange 34 of the damper base 31 from the rear of the vehicle body. Specifically, the first bonding parts 81 are bonded to the base flange 34 via the wheel house body 25 (the top part 25a) (see FIG. 6). The plurality of first bonding parts 81 and the plurality of exposure holes 83 are arranged alternatingly along the lateral direction. Forming the plurality of exposure holes 83 in the bottom end 61a of the parcel member 61 causes the wheel house body 25 to be exposed through the exposure holes 83. The first extending parts 82 are made to extend below the plurality of first bonding parts 81 and the bottom ends thereof are formed into curved shapes. The first extending parts 82 are sections that are bonded as being superimposed on the wheel house patch 36 (specifically, a second bonding part 125 (see FIG. 15)) from the rear of the vehicle body.

Figure 9:
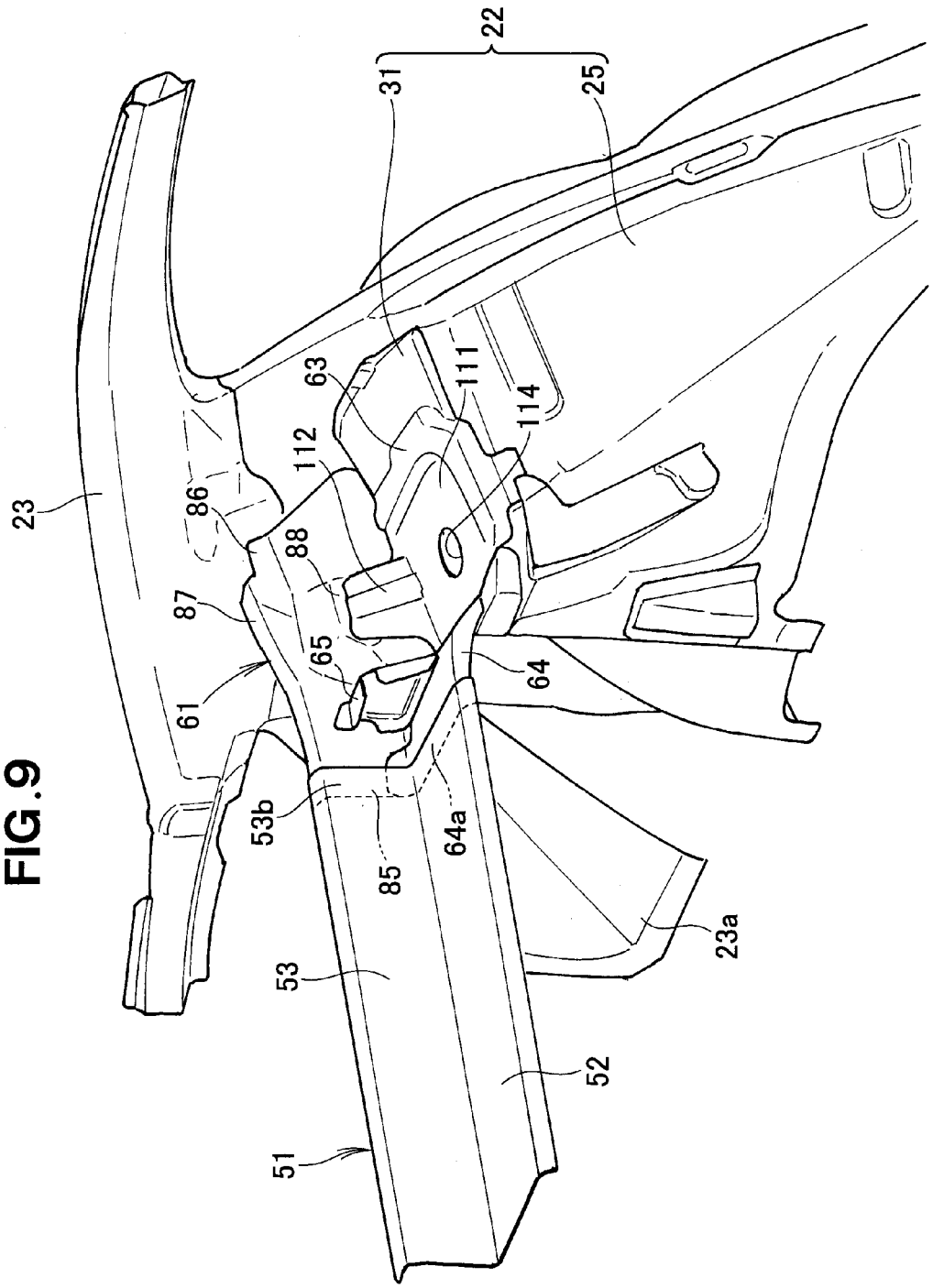
FIG. 9 is a perspective view of the bonded parcel member and parcel cross member of the vehicle body rear structure of FIG. 1.

Furthermore, as shown in FIGS. 7 and 9, the parcel member 61 has an inner bonding part 85 bonded to the rear surface wall 53 of the parcel cross member 51, an outer bonding part 86 bonded to the left rear pillar 23 and the left rear wheel house 22, a top flange 87 to which the parcel support 62 is bonded, and a middle bonding part (in the vertical middle) 88 to which the damper support 63 is bonded.

The inner bonding part 85 is a section bonded from the rear of the vehicle body to an outer end (an end part) 53b on the laterally outward side of the rear surface wall 53 of the parcel cross member 51. The top flange 87 is bent to the rear of the vehicle body to be substantially horizontal, and is a section to which a rear end 92a of a first surface part 92 of the parcel support 62 (the first support member 91) is bonded. The middle bonding part 88 is a section to which a rear support bonding part 112 of the damper support 63 is bonded from the front of the vehicle body.

The inner end 85 of the parcel member 61 is continued into the rear surface wall 53 (the outer end 53b) of the parcel cross member 51, and an outer end 86 of the parcel member 61 is continued into the left rear pillar 23 and the left rear wheel house 22. Specifically, the outer end 53b of the parcel cross member 51 (the rear surface wall 53) is linked to the left rear pillar 23 and the left rear wheel house 22 so as to continue through the parcel member 61.

Figure 10:
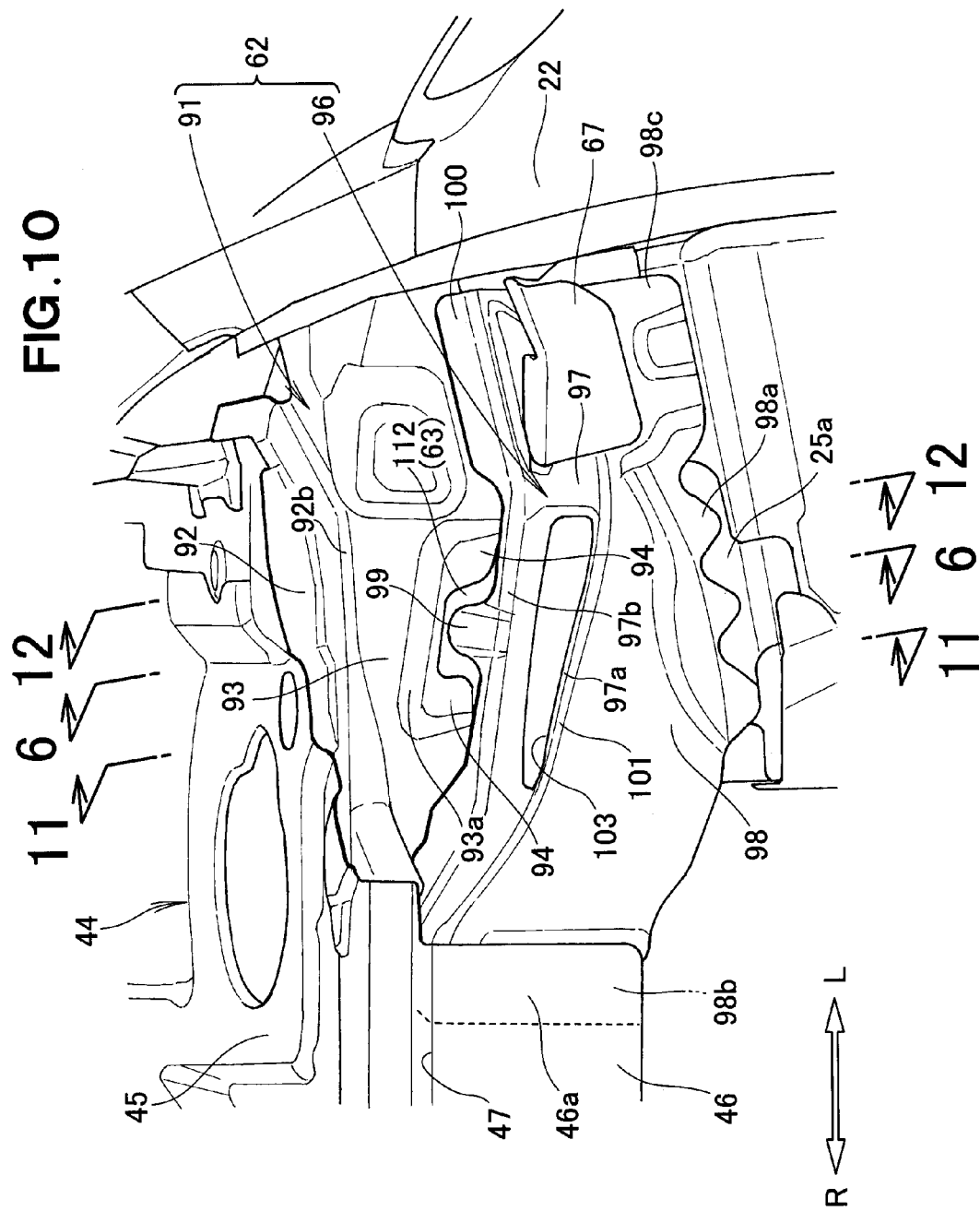
FIG. 10 is a view as indicated by the arrow 10 of FIG. 4.

As shown in FIG. 10, the parcel support 62 is a member that continues into the top surface panel 45 and the front surface wall 46 of the rear parcel 44. The parcel support 62 includes a first support member 91 provided to the vehicle-body-front side of the parcel member 61 (see FIG. 7), and a second support member 96 provided to the vehicle-body-front side of the first support member 91.

As shown in FIGS. 7 and 10, the first support member 91 has a first surface part (a first surface) 92 continuing into the top surface panel 45 of the rear parcel 44, a second surface part (a second surface) 93 hanging down from a front end 92b of the first surface part 92, and a plurality of first protruding flanges (protruding flanges) 94 provided to the bottom end 93a of the second surface part 93. The first support member 91 formed into a substantial L shape in cross section by the first surface part 92, the second surface part 93, and the first protruding flanges 94.

The first surface part 92 is a surface that is formed into a substantially rectangular shape as seen in plan view, and that extends substantially parallel with the top surface panel 45 of the rear parcel 44. The second surface part 93 is formed into a substantially pentagonal shape as seen from the side and is made to hang down from the front end 92b of the first surface part 92, and the plurality of first protruding flanges 94 are provided to the bottom end. The plurality of first protruding flanges 94 are made to protrude downward from the bottom end of the second surface part 93, and are provided at predetermined intervals in the lateral direction. Furthermore, the plurality of first protruding flanges 94 are bonded to the middle bonding part 88 of the parcel member 61 from the front of the vehicle body.

As shown in FIG. 6, the rear end 92a of the first surface part 92 is bonded to the top flange 87 of the parcel member 61, and the first protruding flanges 94 (see also FIG. 7) of the second surface part 93 are bonded to the middle bonding part 88 of the parcel member 61. The top closed cross section 72 is thereby configured from the first support member 91 and the parcel member 61.

As shown in FIGS. 7 and 10, the second support member 96 has a third surface part (a third surface) 97 extending forward toward the front of the vehicle body from the bottom end 93a of the second surface part 93, a fourth surface part (a fourth surface) 98 hanging downward from the front end 97a of the third surface part 97 and bonded to the damper base 31, and a second protruding flange (a protruding flange) 99 that protrudes upward from the rear end 97b of the third surface part 97. Furthermore, the second support member 96 has a second ridge line 101 between the third surface part 97 and the fourth surface part 98. The second ridge line 101 is a corner part formed so as to protrude forward in the vehicle body. The second support member 96 is formed into a substantial L shape in cross section by the third surface part 97 and the fourth surface part 98.

The third surface part 97 is a substantially rectangular surface part as seen in plan view, and is formed so as to be flat in the longitudinal direction of the vehicle body and to slope upward toward the lateral inner side. In the third surface part 97, a work hole 103 is formed above the damper base 31 into a substantially rectangular shape as seen in plan view. Forming the work hole 103 above the damper base 31 allows the damper base 31 to be observed through the work hole 103. The assembly work of attaching the top part of the damper to the damper base 31 of the left rear wheel house 22 can thereby be made easier, as can the work of adjusting the damper (tuning work).

The second protruding flange 99 and a bonding flange 100 are provided to the rear end 97b which is on the vehicle-body-rear side of the third surface part 97. The bonding flange 100 is made to protrude upward from a section farther outward in the lateral direction than the second protruding flange 99 of the rear end 97b, and is bonded to the second surface part 93 of the first support member 91 from the vehicle-body-front side. The second protruding flange 99 is made to protrude upward from the rear end 97b, and is provided between the plurality of first protruding flanges 94 in the lateral direction. Specifically, the first protruding flanges 94 and the second protruding flange 99 are arranged alternatingly in the lateral direction.

Figure 11:
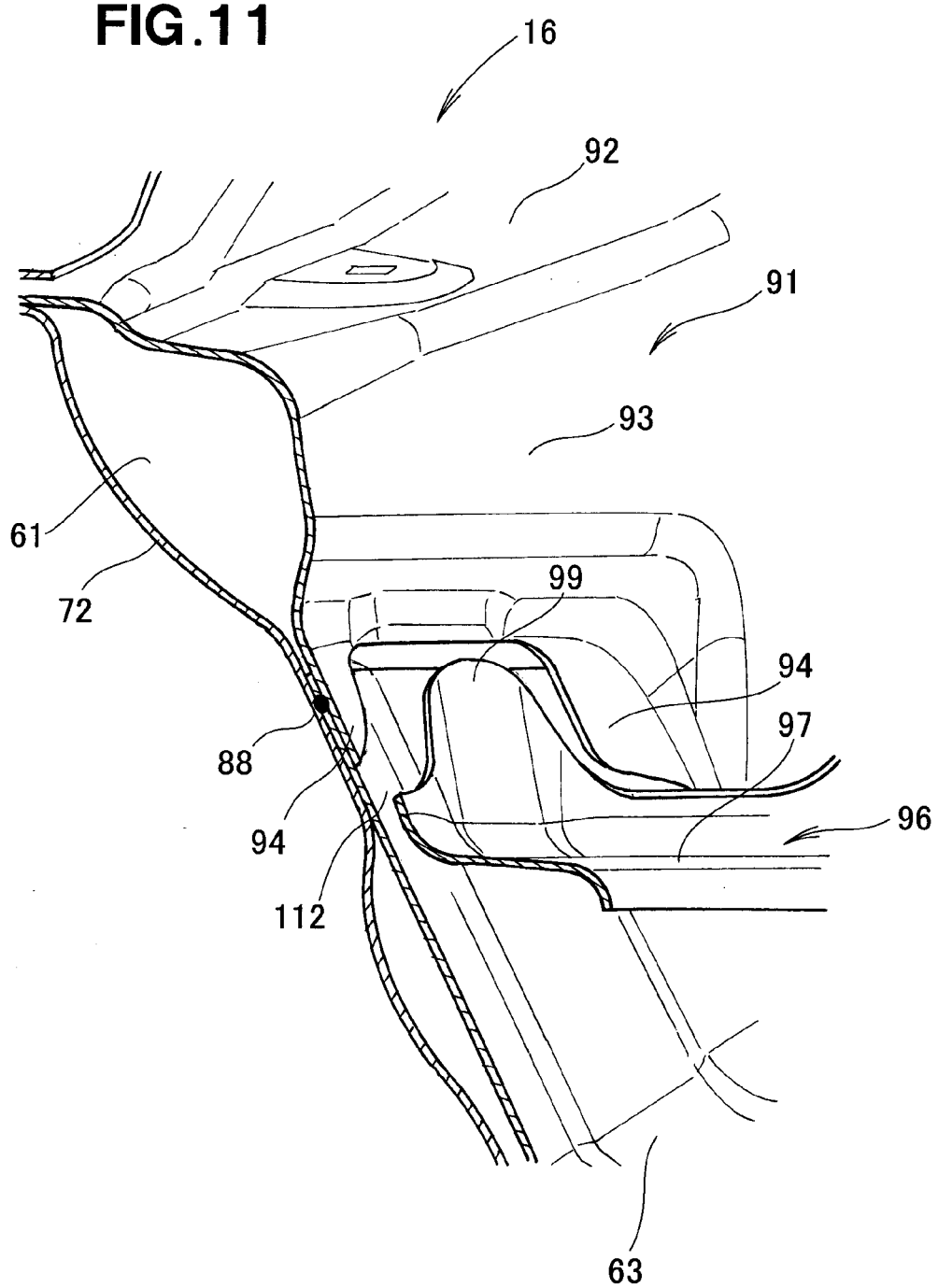
FIG. 11 is a cross-sectional view taken along line 11-11 of FIG. 10.
Figure 12:
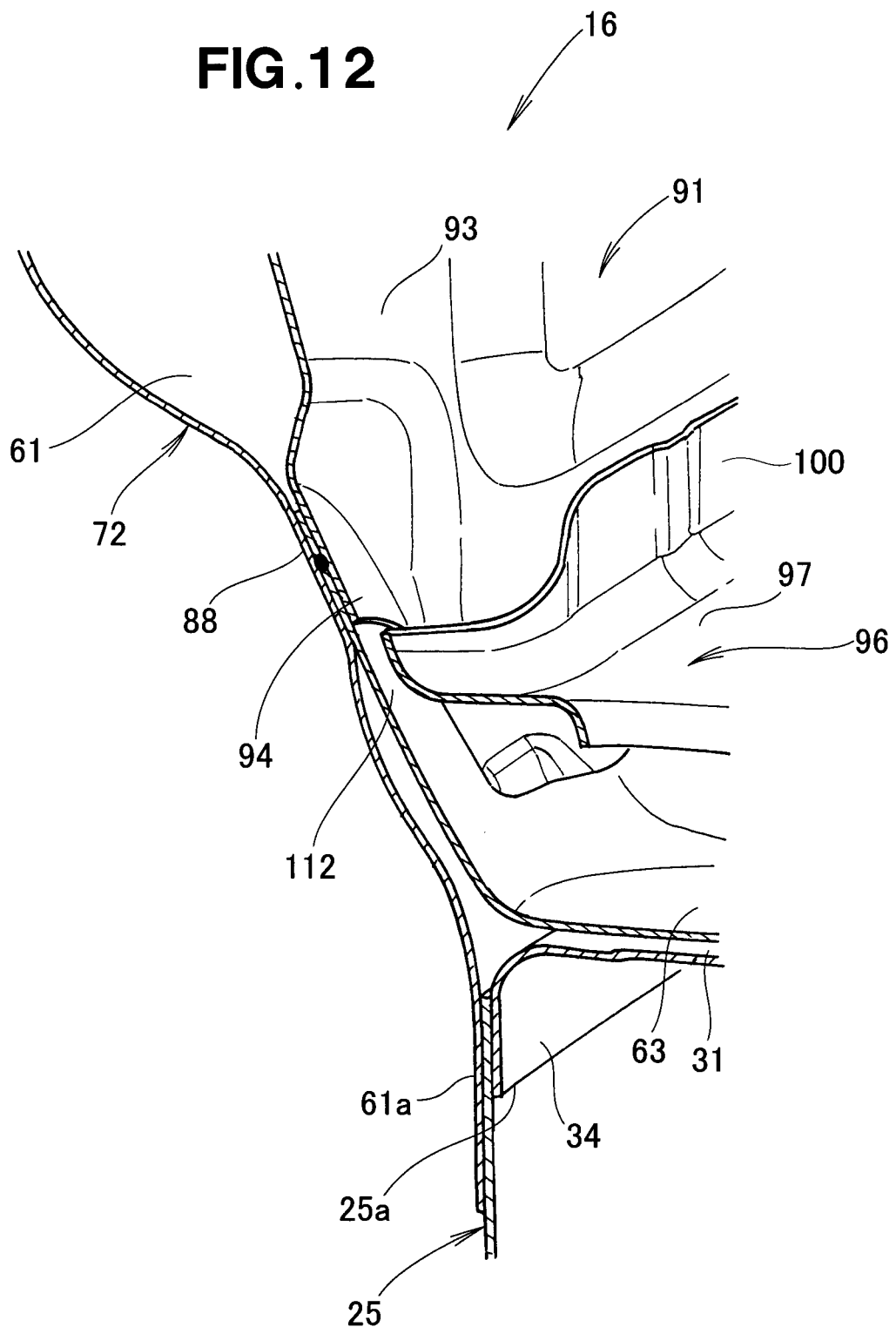
FIG. 12 is a cross-sectional view taken along line 12-12 of FIG. 10.

As shown in FIGS. 11 and 12, the first protruding flanges 94 are superimposed on the middle bonding part 88 of the parcel member 61 and the rear support bonding part 112 of the damper support 63, and in this state these three members are bonded together. Consequently, a large plate thickness dimension can be ensured in the part where these three members 88, 112, and 94 are bonded, and the parcel member 61 (the middle bonding part 88), the damper support 63 (the rear support bonding part 112), and the first protruding flanges 94 can therefore be firmly bonded together. The bonding strength of the part where these three members 88, 112, and 94 are bonded can thereby be increased, and the rigidity and strength of the vehicle body rear part 11 (see FIG. 1) can be improved.

As shown in FIGS. 6 and 7, the second protruding flange 99 is superimposed on the middle bonding part 88 of the parcel member 61 and the rear support bonding part 112 of the damper support 63, in which state these three members are bonded together. Consequently, a large plate thickness dimension can be ensured in the part where these three members 88, 112, and 99 are bonded, and the parcel member 61 (the middle bonding part 88), the damper support 63 (the rear support bonding part 112), and the second protruding flange 99 can therefore be firmly bonded together. The bonding strength of the part where these three members 88, 112, and 99 are bonded can thereby be increased, and the rigidity and strength of the vehicle body rear part 11 (see FIG. 1) can be improved.

In a case in which, for example, the first support member 91 and the second support member 96 are superimposed on the parcel member 61 and the damper support 63 and these four members are bonded together, the plate thickness dimension would be too big in the part where the four members are bonded, and it would be difficult to reliably bond the members together. In view of this, the first protruding flanges 94 of the first support member 91 and the second protruding flange 99 of the second support member 96 are arranged alternatingly in the lateral direction.

Consequently, three members are bonded together: the parcel member 61 (the middle bonding part 88), the damper support 63 (the rear support bonding part 112), and the first protruding flanges 94. Another three members are also bonded together: the parcel member 61 (the middle bonding part 88), the damper support 63 (the rear support bonding part 112), and the second protruding flange 99. The three members 88, 112, and 94 and the three members 88, 112, and 99 can thereby be reliably bonded together, and the rigidity and strength of the vehicle body rear part 11 (see FIG. 1) can therefore be improved.

The fourth surface part 98 hangs down from the front end 97*a* of the third surface part 97, and a bottom end 98*a* thereof is bonded to the damper base 31. The fourth surface part 98 is formed to slope upward and laterally inward along the third surface part 97. Specifically, the bottom end 98*a* of the fourth surface part 98 is bonded to the base flange 34 of the damper base 31 via the top part 25*a* of the wheel house body 25. As shown in FIG. 10, an inner end 98*b* of the fourth surface part 98 is bonded to the rear parcel 44 (specifically, a left end 46*a* of the front surface wall 46). Furthermore, an outer end 98*c* of the fourth surface part 98 is linked to the left rear wheel house 22 via the wheel house gusset 67.

As shown in FIG. 10, the second ridge line 101 is formed between the third surface part 97 and the fourth surface part 98, and this line continues into the first ridge line 47 of the rear parcel 44 and extends laterally outward. The second ridge line 101 is formed as a corner so as to protrude forward in the vehicle body, similar to the first ridge line 47. Consequently, making the first ridge line 47 and the second ridge line 101 continuous in the lateral direction makes it possible for loads to be more suitably (efficiently) transferred by the first ridge line 47 and the second ridge line 101, and the rigidity and strength of the vehicle body rear part 11 can therefore be further improved.

Thus, as shown in FIG. 6, the second support member 96 is bonded to the first support member 91 (the parcel member 61) and the damper base 31. The bottom closed cross section 73 is thereby configured from the second support member 96, the parcel member 61, the first support member 91, and the damper base 31.

As shown in FIG. 7, the damper support 63 is provided to the damper support surface part 32 of the damper base 31, and is bonded so as to continue into the parcel cross member 51 (see FIG. 3) via the parcel shelf support 64. The rigidity and strength of the damper support surface part 32 can be increased by the damper support 63, by providing the damper support 63 to the damper support surface part 32. The top part of the damper can thereby be suitably supported by the damper support surface part 32 and the damper support 63.

The damper support 63 has a substantially flat support part 111, the rear support bonding part 112 rising up from a rear end 111*a* of the support part 111, and an inner support bonding part 113 rising up from an inner end 111*b* of the support part 111. The support part 111, which is formed into a substantially rectangular shape as seen in plan view, has an attachment hole 114 positioned on the same axis as the damper attachment hole 33 of the damper support surface part 32. The support part 111 is provided to the damper support surface part 32, and the rear support bonding part 112 is bonded to the middle bonding part 88 of the parcel member 61. Furthermore, the inner support bonding part 113 is bonded to a proximal part 64*c* of an outer end 64*b* of the parcel shelf support 64.

Figure 13:
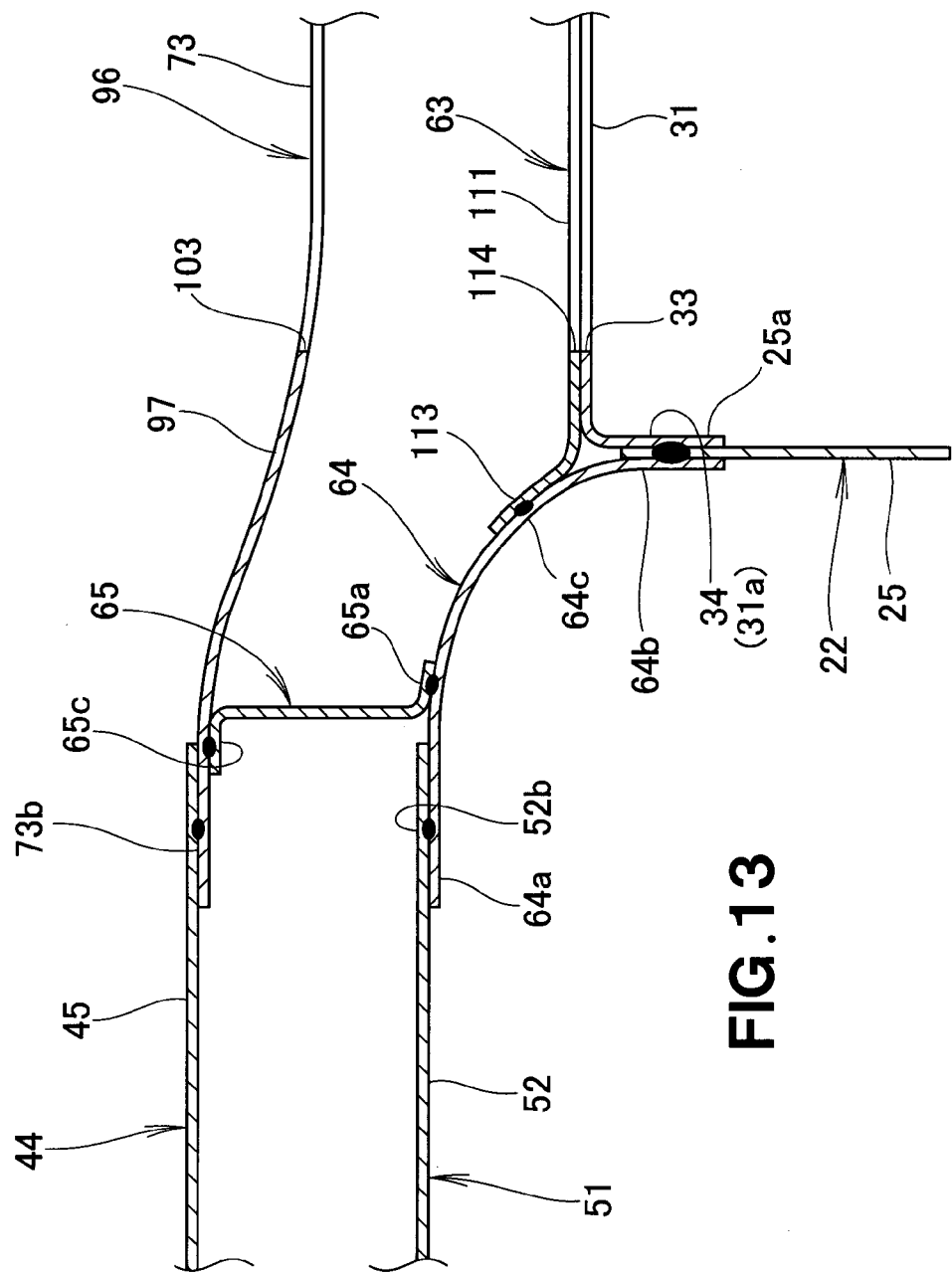
FIG. 13 is a cross-sectional view taken along line 13-13 of FIG. 4.

As shown in FIGS. 7 and 13, the parcel shelf support 64 is a member that links an inner end (an end part) 31*a* on the laterally inward side of the damper base 31, and an outer end (an end part) 52*b* on the laterally outward side of the bottom surface part 52 in the parcel cross member 51. The parcel shelf support 64 is a band-shaped member formed sloping downward from the outer end 52*b* of the parcel cross member 51 (the bottom surface part 52) toward the inner end 31*a* of the damper base 31. The rear parcel 44 is provided higher than the damper base 31. Consequently, forming the parcel shelf support 64 at a downward slope makes it possible for the damper support 63 and the parcel cross member 51 to be linked by the parcel shelf support 64.

Specifically, an inner end 64*a* of the parcel shelf support 64 is bonded to the outer end 52*b* of the parcel cross member 51 (the bottom surface part 52), and the outer end 64*b* is bonded to the inner end 31*a* of the damper base 31 via the wheel house body 25 (the top part 25*a*). Furthermore, the proximal part 64*c* of the outer end 64*b* of the parcel shelf support 64 is bonded to the inner support bonding part 113 of the damper support 63.

Additionally, a front flange 64*d* of the parcel shelf support 64 is bonded to an inside bottom end 98*d* of the fourth surface part 98, and a rear flange 64*e* is bonded to the inner bonding part 85 of the parcel member 61. A part of the second closed cross section 71 (i.e. the laterally inward side section of the second closed cross section 71) is thereby formed by the parcel shelf support 64, the second support member 96, and the parcel member 61.

Thus, forming the parcel shelf support 64 at a downward slope makes it possible to link the damper support 63 and the parcel cross member 51, which are at different heights. The parcel cross member 51 is a member constituting a part of the first closed cross section 55. The damper support 63 is a member constituting a part of the second closed cross section 71. Consequently, the second closed cross section 71 can be linked to the first closed cross section 55 even in cases in which the damper support 63 and the parcel cross member 51 are at different heights. Loads can thereby be suitably (efficiently) transferred between the left rear wheel house 22 and the rear parcel 44, and the rigidity and strength of the vehicle body rear part 11 (see FIG. 1) can therefore be improved.

Furthermore, the bottom surface part 52 of the parcel cross member 51 can be made to continue into the damper base 31 via the parcel shelf support 64. Consequently, when the load of the first closed cross section 55 (the parcel cross member 51) is transferred to the second closed cross section 71 (the damper base 31), the load can be transferred through the damper base 31 to the left rear wheel house 22 (i.e. a member of comparatively high rigidity and strength). The transferred load can thereby be suitably supported by the left rear wheel house 22, and the rigidity and strength of the vehicle body rear part 11 (see FIG. 1) can therefore be further improved.

As shown in FIGS. 3 and 7, the inner bulkhead 65 is bonded from above at a bottom end 65*a* (see FIG. 13) to the parcel shelf support 64 (the inner end 64*a*), bonded from the vehicle body rear at a front end 65*b* to the second support member 96 (the fourth surface part 98), and bonded from below at a top end 65*c* (see also FIG. 13) to the second support member 96 (the third surface part 97). The inner bulkhead 65 is provided to the inner end 73*b* of the bottom closed cross section 73. Providing the inner bulkhead 65 to the inner end 73*b* of the bottom closed cross section 73 causes the first closed cross section 55 (FIG. 3) and the second closed cross section 71 to be partitioned by the inner bulkhead 65.

Thus, providing the inner bulkhead 65, which partitions the first closed cross section 55 (FIG. 3) and the second closed cross section 71, makes it possible to further increase the rigidity and strength between the first closed cross section 55 and the second closed cross section 71. Loads can thereby be transferred more suitably (efficiently) between the left vehicle body side part 12 (see FIG. 1) and the rear parcel 44, and the rigidity and strength of the vehicle body rear part 11 (see FIG. 1) can therefore be further improved.

The rear end of the outer bulkhead 66 is bonded from the front of the vehicle body to the outer bonding part 86 of the parcel member 61, and the front end is bonded from the rear of the vehicle body to the second surface part 93 of the first support member 91. Consequently, the outer bulkhead 66 is provided to the interior of the top closed cross section 72, and the rigidity and strength of the top closed cross section 72 is increased.

As described above, in the left support unit 16, the parcel member 61 is linked to the rear surface wall 53 of the parcel cross member 51 and to the left vehicle body side part 12 (the left rear pillar 23 and the left rear wheel house 22), and the parcel shelf support 64 is linked to the bottom surface part 52 of the parcel cross member 51 and the damper base 31. Furthermore, the damper support 63 can be firmly supported by bonding the damper support 63 to the parcel member 61 and the parcel shelf support 64. Providing the damper support 63 to the top part of the damper base 31 makes it possible to sufficiently increase the rigidity and strength of the damper base 31 with the damper support 63.

Attaching the top part of the damper (the shock absorber) to the damper support 63 and the damper base 31 allows loads to be transferred from the top part of the damper to the damper base 31 and the damper support 63. Because the rigidity and strength of the damper base 31 are sufficiently increased, transferred loads are efficiently transferred to the left vehicle body side part 12 (the left rear pillar 23 and the left rear wheel house 22) and the rear parcel 44 via two members: the parcel member 61 and the parcel shelf support 64. Loads transferred from the top part of the damper to the damper support 63 and the damper base 31 can thereby be sufficiently supported by the left vehicle body side part 12 (the left rear pillar 23 and the left rear wheel house 22) and the rear parcel 44.

Figure 14:
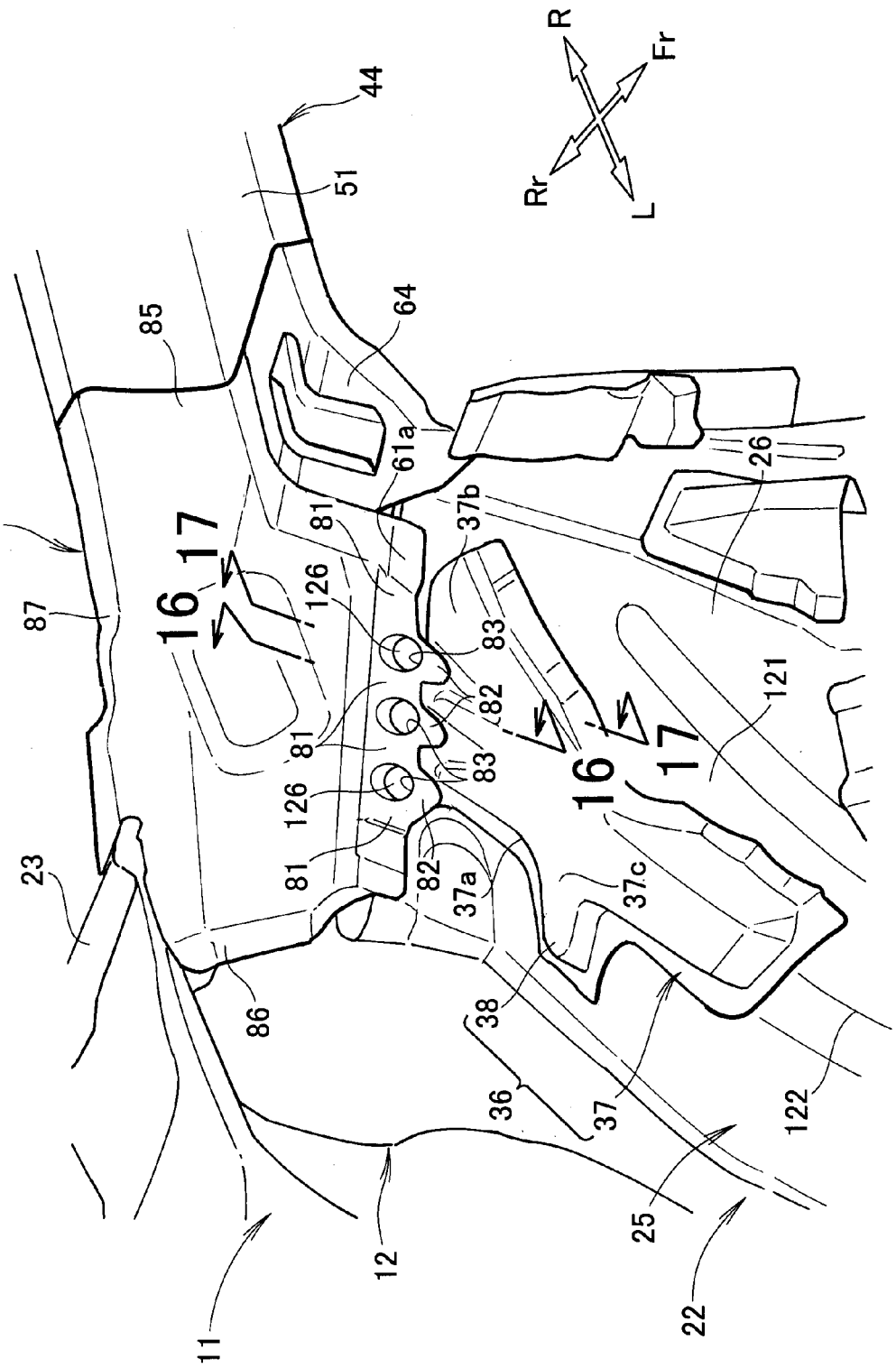
FIG. 14 is an enlarged view of section 14 of FIG. 8.
Figure 15:
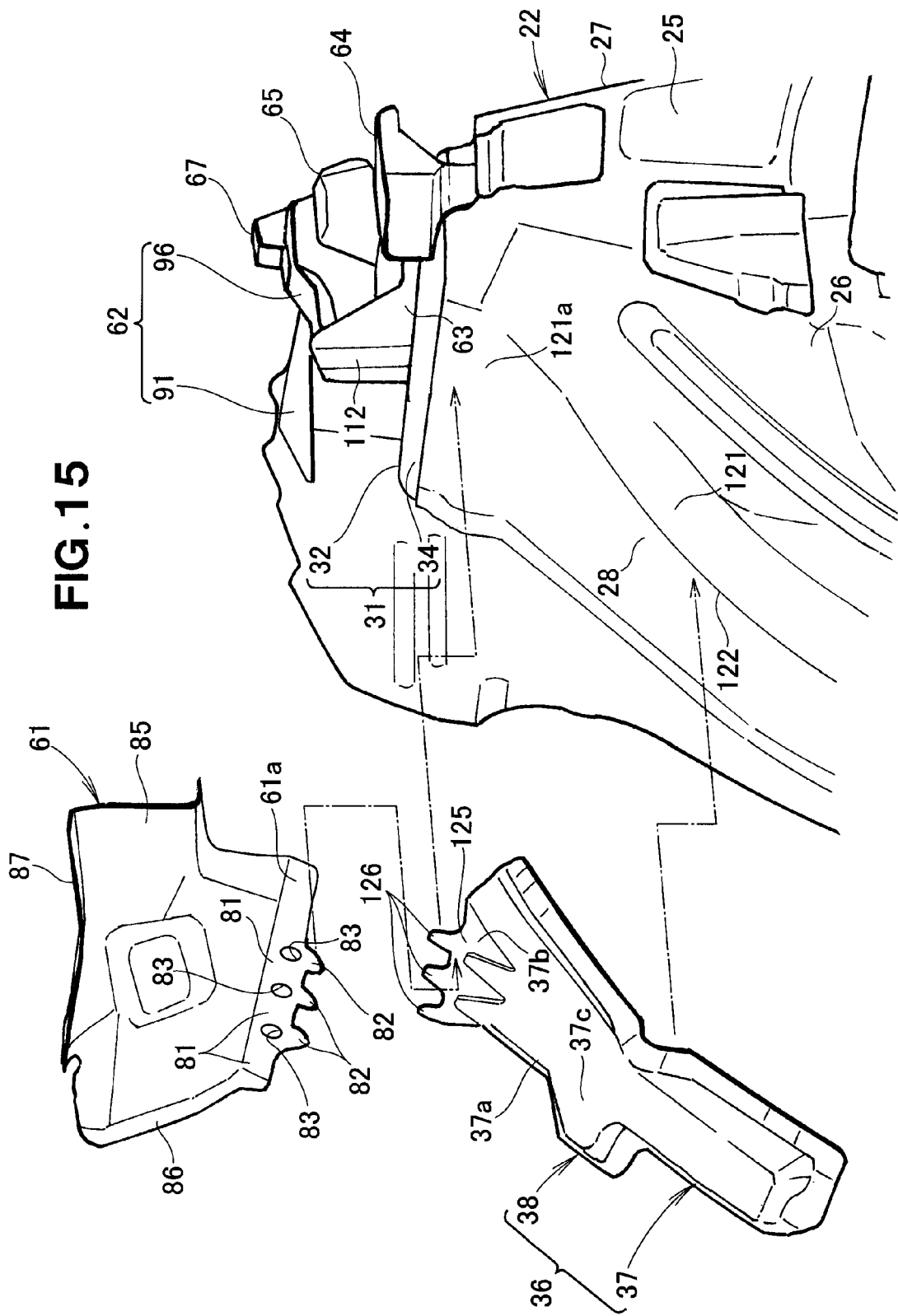
FIG. 15 is an exploded perspective view of the vehicle body rear structure of FIG. 14.

Next, the previously-described wheel house patch 36 will be described in detail with reference to FIGS. 14 to 17. As shown in FIGS. 14 and 15, the wheel house patch 36 is bonded so as to extend along a rear curved part 121 of the left rear wheel house 22 (specifically, the wheel house body 25). The wheel house patch 36 has a patch body 37 provided along a wheel ridge line (a ridge line) 122 between the wheel side wall 26 and the wheel rear wall 28, and an extending reinforcing part 38 extending laterally outward from an outer edge 37a of the patch body 37.

When the patch body 37 is arranged along the wheel ridge line 122 between the wheel side wall 26 and the wheel rear wall 28, the outer periphery of the patch body is bonded to the wheel side wall 26 and the wheel rear wall 28. The patch body 37, which is formed into a substantially rectangular shape as seen in plan view, has the second bonding part 125 in a top end 37b (the top end of the wheel house patch 36), and a plurality of second extending parts 126.

The second bonding part 125, which is provided to the top end 37b of the patch body 37, is bonded as being superimposed on the top end of the wheel side wall 26 and the top end of the wheel rear wall 28 (i.e. a top part 121a of the rear curved part 121). The plurality of second extending parts 126 are made to extend higher than the second bonding part 125, and the top ends thereof are formed into curved shapes. The plurality of second extending parts 126 are bonded as being superimposed on the top part 121a of the rear curved part 121, similar to the second bonding part 125.

Bonding the plurality of first bonding parts 81 of the parcel member 61 to the top part 121a of the rear curved part 121 causes the plurality of second extending parts 126 to be exposed to the exterior through the plurality of exposure holes 83 formed in the parcel member 61. Furthermore, the first extending parts 82 of the parcel member 61 are bonded from above to the second bonding part 125. The top part 121a of the rear curved part 121 is a section that shows the vehicle-body-rear side of the top part 25a of the wheel house body 25.

Figure 16:
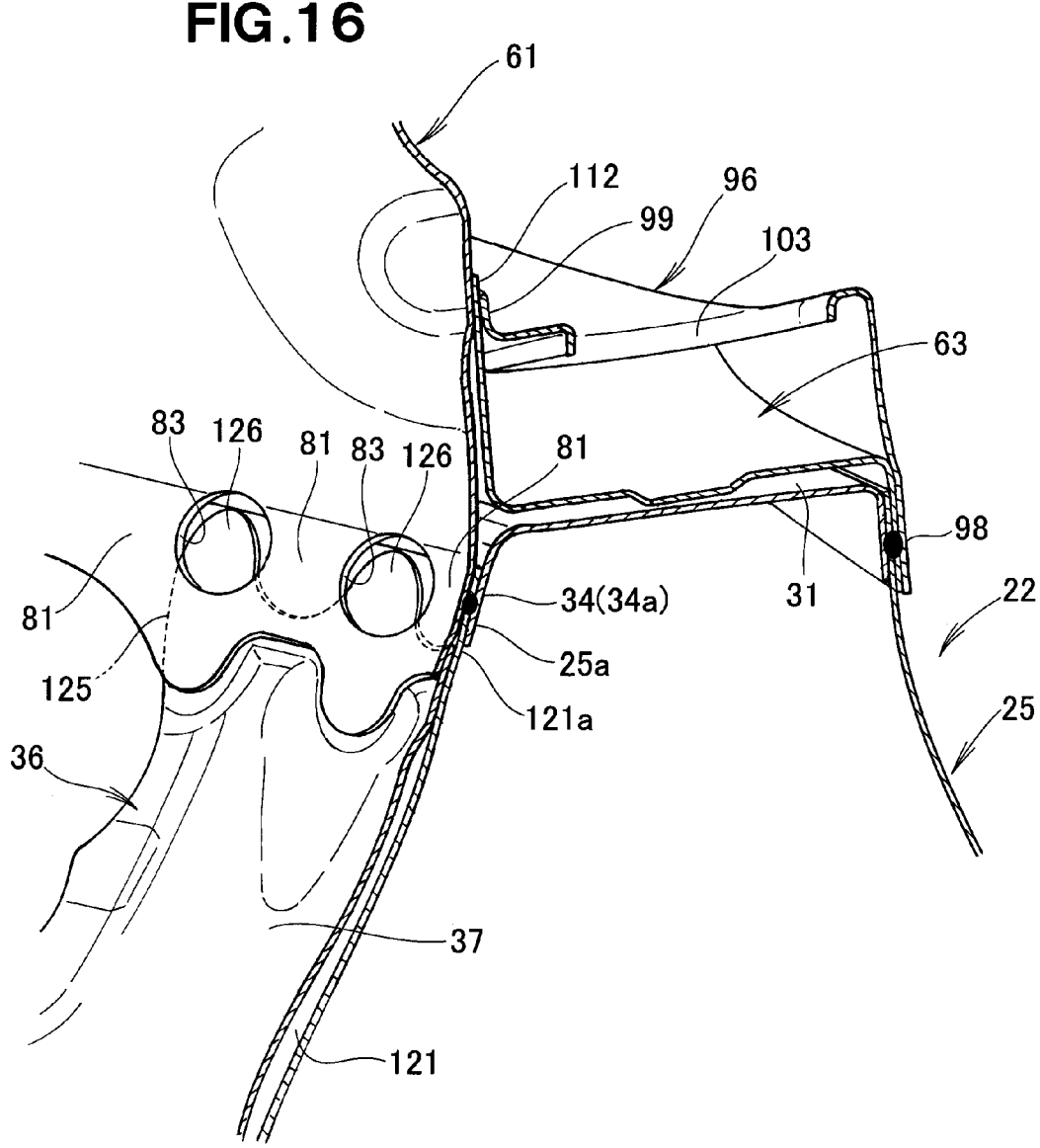
FIG. 16 is a cross-sectional view taken along line 16-16 of FIG. 14.

As shown in FIG. 16, the top part 121a of the rear curved part 121 is bonded to a vehicle-body-rear part 34a of the base flange 34, and the first bonding parts 81 of the parcel member 61 are bonded to the top part 121a of the rear curved part 121. Specifically, the base flange 34 (the vehicle-body-rear part 34a), the rear curved part 121 (the top part 121a), and the parcel member 61 (the first bonding parts 81) are superimposed, and these three members 34a, 121a, and 81 are bonded together in this state. Consequently, a large plate thickness dimension can be ensured in the part where these three members 34a, 121a, and 81 are bonded, and the base flange 34 (the vehicle-body-rear part 34a), the rear curved part 121 (the top part 121a), and the first bonding parts 81 can be bonded firmly.

Figure 17:
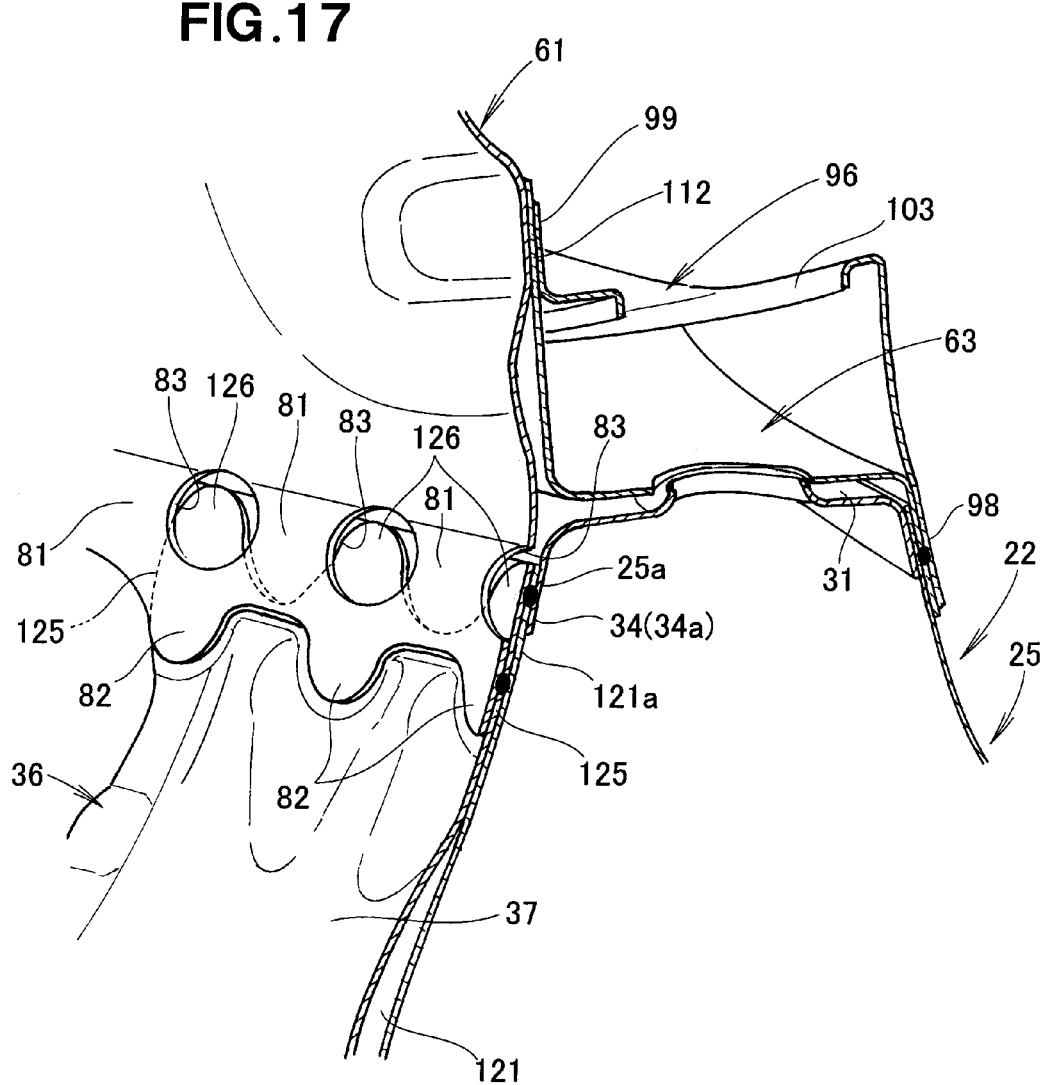
FIG. 17 is a cross-sectional view taken along line 17-17 of FIG. 14.

As shown in FIG. 17, the second bonding part 125 of the patch body 37 is bonded to the top part 121a of the rear curved part 121, and the first extending parts 82 of the parcel member 61 are bonded to the second bonding part 125. Specifically, the first extending parts 82 are superimposed on the second bonding part 125 and the top part 121a of the rear curved part 121, and these three members 82, 125, and 121a are bonded in this state.

Consequently, a large plate thickness dimension can be ensured in the part where the three members 82, 125, and 121a are bonded, and the first extending parts 82, the second bonding part 125, and the top part 121a of the rear curved part 121 can therefore be firmly bonded together. Thus, the first bonding parts 81 and first extending parts 82 of the parcel member 61 are firmly bonded to the top part 121a of the rear curved part 121 and other components, and the parcel member 61 is thereby firmly bonded to the top part 121a of the rear curved part 121 (i.e. the top part 25a of the wheel house body 25).

The top part 121a of the rear curved part 121 is also bonded to the vehicle-body-rear part 34a of the base flange 34, and the second extending parts 126 of the patch body 37 are bonded to the top part 121a of the rear curved part 121. Specifically, the second extending parts 126 are superimposed on the base flange 34 (the vehicle-body-rear part 34a) and the rear curved part 121 (the top part 121a), and these three members 126, 34a, and 121a are bonded together in this state.

Consequently, a large plate thickness dimension can be guaranteed in the part where these three members 126, 34a, and 121a are bonded, and the second extending parts 126, the base flange 34 (the vehicle-body-rear part 34a), and the rear curved part 121 (the top part 121a) can be firmly bonded together. Thus, the second bonding part 125 and second extending parts 126 of the patch body 37 are firmly bonded to the top part 121a of the rear curved part 121 and other components, and the patch body 37 is thereby firmly bonded to the top part 121a of the rear curved part 121 (i.e. the top part 25a of the wheel house body 25).

As described above, firmly bonding the parcel member 61 and the patch body 37 (the wheel house patch 36) to the top part 25a of the wheel house body 25 makes it possible improve the rigidity and strength of the vehicle body rear part 11 (see FIG. 14).

As shown in FIG. 14, the parcel member 61 is a member linking the parcel cross member 51 and the left vehicle body side part 12 (the left rear pillar 23 and the left rear wheel house 22). Consequently, the parcel member 61 is firmly bonded to the top part 25a of the wheel house body 25, and loads can thereby be efficiently transferred between the parcel cross member 51 (i.e. the rear parcel 44) and the left vehicle body side part 12. Furthermore, the second bonding part 125 of the wheel house patch 36 is firmly bonded to the first extending parts 82 of the parcel member 61. Consequently, loads can be efficiently transferred between the left rear wheel house 22 and the parcel member 61.

Thus, the parcel cross member 51 and the left vehicle body side part 12 are firmly linked by the parcel member 61 and the wheel house patch 36 is firmly linked to the parcel member 61, whereby the rigidity and strength of the vehicle body rear part 11 can be further improved. Loads can thereby be efficiently transferred between the left rear wheel house 22 (the left vehicle body side part 12) and the parcel cross member 51 (the rear parcel 44), and also between the left rear wheel house 22 and the left rear pillar 23.

Furthermore, the wheel house patch 36 is provided along the wheel ridge line 122 of the left rear wheel house 22. The wheel ridge line 122 is a comparatively highly rigid section of the left rear wheel house 22. The wheel house patch 36 is thereby provided along the wheel ridge line 122, whereby the left rear wheel house 22 can be suitably (effectively) reinforced by the wheel house patch 36.

As shown in FIGS. 14 and 15, the extending reinforcing part 38 extends laterally outward from a longitudinal middle 37c in the outer edge 37a of the patch body 37 (in other words, the longitudinal middle of the wheel ridge line 122). While extending laterally outward, the extending reinforcing part 38 is bonded to the wheel rear wall 28.

Reinforcing the wheel ridge line 122 of the left rear wheel house 22 (specifically, the wheel house body 25) with the wheel house patch 36 increases the difference in strength with other sections of the wheel house body 25. Therefore, stress concentrates in sections that are greatly different in strength, which is thought to cause bending in the wheel house body 25. In view of this, the extending reinforcing part 38 is extended laterally outward (toward the side of the vehicle body) from the longitudinal middle 37c of the patch body 37.

Consequently, another section of the wheel house body 25 can be reinforced with the extending reinforcing part 38. Reinforcing another section can minimize the difference in strength between the other section and the section reinforced with the wheel house patch 36. Stress concentration due to loads imposed on the wheel house body 25 can thereby be minimized, and imposed loads can be dispersed to the left vehicle body side part 12 via the extending reinforcing part 38. Therefore, the rigidity and strength of the wheel house body 25 (i.e. the vehicle body rear part 11) can be further increased.

Furthermore, a U-shaped cross section is formed by the wheel house body 25, the wheel side wall 26, the wheel front wall 27 (see also FIG. 2), and the wheel rear wall 28. Consequently, the rear curved part 121 maintains high rigidity and strength in the section near the wheel side wall 26. In view of this, high rigidity and strength are also maintained in the section of the wheel rear wall 28 of the rear curved part 121 by extending the extending reinforcing part 38 laterally outward. The wheel house body 25 (i.e. the left rear wheel house 22) can thereby be formed into a member of even higher rigidity and strength.

Figure 18:
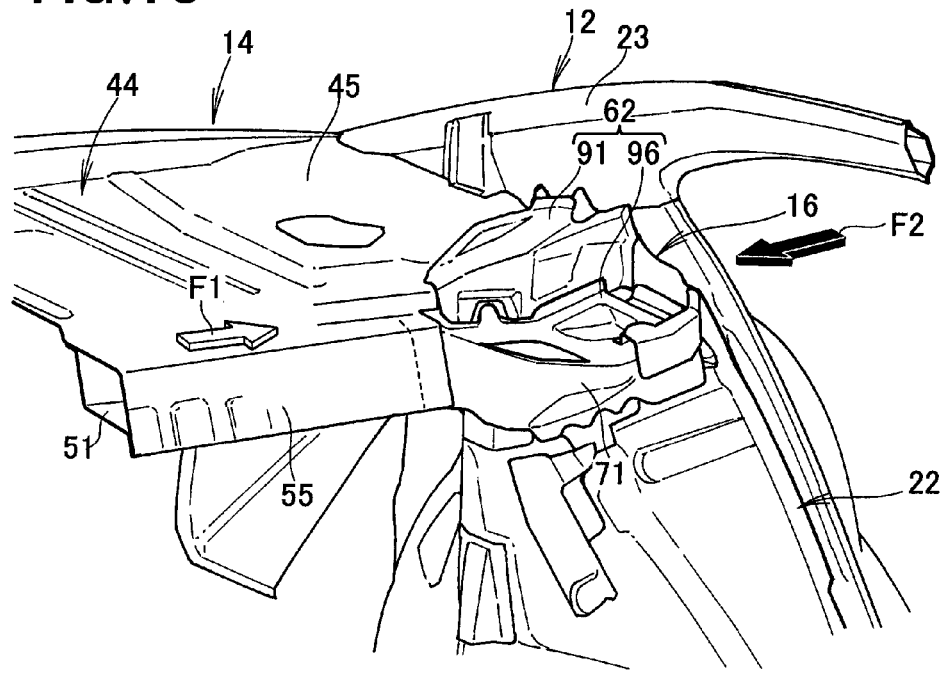
FIG. 18 is a view illustrating an example in which loads are transferred between the rear parcel and the left vehicle body side part of the vehicle body rear structure according to the present invention.

Next, an example of a load being transferred between the parcel cross member 51 (the rear parcel unit 14) and the left vehicle body side part 12 will be described with reference to FIG. 18. As shown in FIG. 18, the rear parcel unit 14 and the left vehicle body side part 12 are interconnected by the left support unit 16. The left support unit 16 includes the second closed cross section 71. The rear parcel unit 14 includes the first closed cross section 55. The first closed cross section 55 and the second closed cross section 71 are linked as being arranged along the lateral direction. The first closed cross section 55 and the second closed cross section 71 herein are both sections of high rigidity and strength due to being formed as closed cross sections.

Consequently, when a load F1 is imposed laterally outward on the rear parcel unit 14 as indicated by the arrow, the imposed load F1 can be efficiently transferred to the left vehicle body side part 12 via the left support unit 16. When a load F2 is imposed laterally inward on the left vehicle body side part 12 as indicated by the arrow, the imposed load F2 can be efficiently transferred to the rear parcel unit 14 via the left support unit 16.

Thus, placing the left support unit 16 between the rear parcel unit 14 and the left vehicle body side part 12 enables loads to be efficiently transferred even when the rear parcel unit 14 is provided comparatively far above the left rear wheel house 22. Loads imposed on the rear parcel unit 14 and the left vehicle body side part 12 can thereby be suitably supported, and the rigidity and strength of the vehicle body rear part 11 can therefore be increased.

Figure 19:
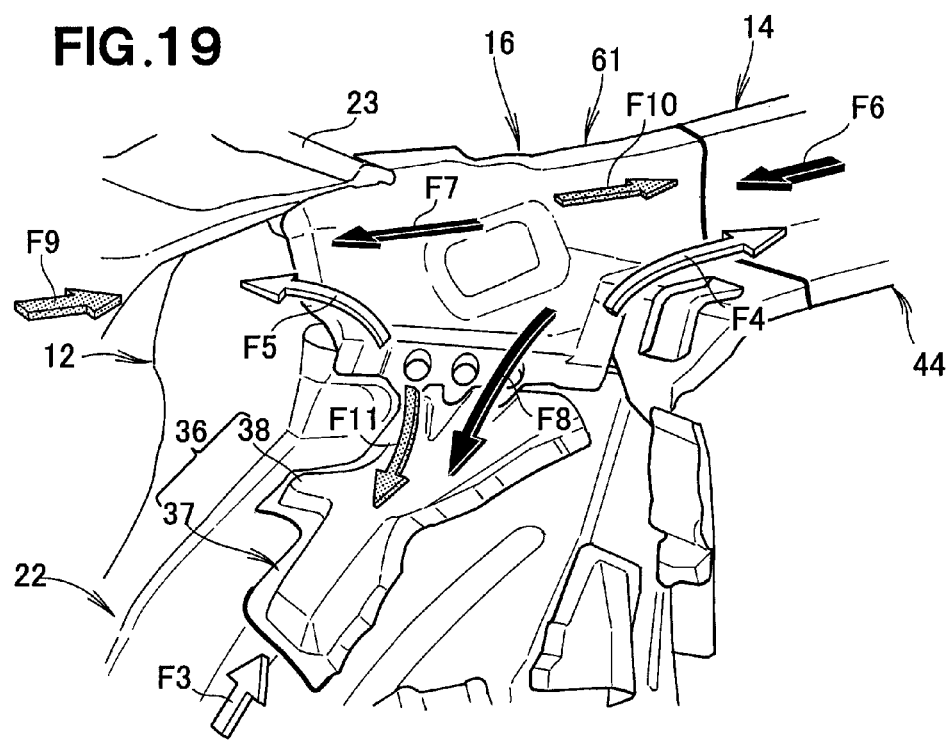
FIG. 19 is a view illustrating an example in which loads are transferred between the left rear wheel house and the rear parcel, and also between the left rear wheel house and the left rear pillar, in the vehicle body rear structure according to the present invention.

Next, an example of a load being transferred between the left rear wheel house 22 and the rear parcel unit 14, and also between the left rear wheel house 22 and the left rear pillar 23, will be described with reference to FIG. 19. As shown in FIG. 19, the wheel house patch 36 is provided to the left rear wheel house 22 (the top part 121a of the rear curved part 121), and the parcel member 61 (the left support unit 16) is firmly bonded to the wheel house patch 36.

Consequently, when a load F3 is imposed upward on the rear part of the left rear wheel house 22 as indicated by the arrow, some of the imposed load F3 can be efficiently disposed as a load F4 to the rear parcel unit 14 via the left support unit 16. The rest of the imposed load F3 can be efficiently dispersed and transferred as a load F5 to the left rear pillar 23 via the left support unit 16.

When a load F6 is imposed laterally outward on the rear parcel unit 14 as indicated by the arrow, some of the imposed load F6 can be efficiently transferred as a load F7 to the rear part of the left rear pillar 23 via the left support unit 16. The rest of the imposed load F6 can be efficiently dispersed and transferred as a load F8 to the left rear wheel house 22 via the left support unit 16.

Furthermore, when a load F9 is imposed laterally inward on the left rear pillar 23 as indicated by the arrow, some of the imposed load F9 can be efficiently transferred as a load F10 to the rear parcel unit 14 via the left support unit 16. The rest of the imposed load F9 can be efficiently dispersed and transferred as a load F11 to the left rear wheel house 22 via the left support unit 16.

Thus, firmly bonding the left support unit 16 to the wheel house patch 36 enables loads to be efficiently transferred between the left rear wheel house 22 and the rear parcel unit 14, and also between the left rear wheel house 22 and the left rear pillar 23. Loads imposed on the left rear wheel house 22, the rear parcel unit 14, and the left rear pillar 23 can thereby be suitably supported, and the rigidity and strength of the vehicle body rear part 11 can therefore be further increased.

The vehicle body rear structure according to the present invention is not limited to the previously described embodiment, and changes, improvements, and the like can be made as appropriate. For example, in the embodiment, and example was described in which the base flange 34 was bonded to the inner peripheral wall 25b of the wheel house body 25 (the top part 25a), but the invention is not limited as such, and the base flange 34 could also be bonded to the outer peripheral wall of the wheel house body 25 (the top part 25a). In this case, the base flange 34 would be exposed to the exterior through the plurality of exposure holes 83.

An example was described in the embodiment in which one extending reinforcing part 38 was provided to the wheel house patch 36, but the invention is not limited as such and any desired multiple number of extending reinforcing parts 38 could be selected.

Furthermore, the shapes and configurations of components shown in the embodiment, such as the vehicle body rear structure, the left and right vehicle body side parts, the left rear wheel house, the left rear pillar, the wheel side wall, the wheel front wall, the wheel rear wall, the damper base, the damper support surface part, the base flange, the wheel house patch, the patch body, the extending reinforcing part, the rear parcel, the parcel cross member, the first closed cross section, the second closed cross section, the top closed cross section, the bottom closed cross section, the parcel member, the first bonding parts, the first extending parts, the second bonding part, the second extending parts, the damper support, the parcel support, the parcel shelf support, the inner bulkhead, the first support member, the second support member, the first protruding flanges, the second protruding flange, and the work hole, are not limited to those exemplified and can be changed as appropriate.

INDUSTRIAL APPLICABILITY

The vehicle body rear structure of the present invention is suitable for application in an automobile in which left and right vehicle body side parts are configured from the rear wheel house and the rear pillar, and a rear parcel is included between the vehicle body side parts.

KEY TO SYMBOLS

10: vehicle body rear structure, 12: left and right vehicle body side parts (pair of vehicle body side parts), 22: left rear wheel house (rear wheel house), 22a: top part of left rear wheel house, 23: left rear pillar (rear pillar), 31: damper base, 31a: inner end (end part) on laterally inward side of damper base, 32: damper support surface part (top part), 41: trunk, 42: passenger compartment, 44: rear parcel, 45: top surface panel (top surface) of rear parcel, 46: front surface wall (front surface) of rear parcel, 47: first ridge line, 51: parcel cross member, 52: bottom surface part (bottom surface) of parcel cross member, 52b: outer end (end part) on laterally outward side of parcel cross member, 53: rear surface wall (rear surface) of parcel cross member, 53b: outer end (end part) on laterally outward side of rear surface wall, 55: first closed cross section, 61: parcel member (rear parcel member), 62: parcel support, 63: damper support, 64: parcel shelf support, 65: inner bulkhead (bulkhead), 71: second closed cross section, 72: top closed cross section, 73: bottom closed cross section, 88: middle bonding part (vertical middle) of parcel member, 91: first support member, 92: first surface part (first surface) of first support member, 93: second surface part (second surface) of first support member, 94: first protruding flanges (protruding flanges), 96: second support member, 97: third surface part (third surface) of second support member, 98: fourth surface part (fourth surface) of second support member, 99: second protruding flange (protruding flange), 101: second ridge line, 103: work hole

The invention claimed is:

1. A vehicle body rear structure comprising:
   a pair of vehicle body side parts, each of the pair of vehicle side parts configured from one of a pair of rear wheel houses and one of a pair of rear pillars, and a predetermined gap in a lateral direction is provided between the pair of vehicle body side parts;
   a rear parcel provided between the pair of vehicle body side parts and adapted to partition a trunk and a passenger compartment;
   a parcel cross member that is bonded to the underside of the rear parcel, and that together with the rear parcel constitutes a first closed cross section extending laterally; and
   a pair of rear parcel members and a pair of parcel supports that are bonded to the first closed cross section and constitute a pair of second closed cross sections each extending from the first closed cross section to one of the pair of vehicle body side parts,
   wherein each of the pair of rear wheel houses includes a damper base in a top part thereof, each damper base constituting a part of one of the second closed cross sections,
   wherein: the rear parcel has a top surface vertically partitioning the trunk and the passenger compartment, and a front surface hanging down from the top surface; the parcel cross member has a bottom surface facing the top surface and a rear surface facing the front surface; the first closed cross section is configured from the top surface and the front surface of the rear parcel, and the bottom surface and the rear surface of the parcel cross member; and each of the pair of second closed cross sections is configured from one of the pair of rear parcel members extending into a laterally outer side of the rear surface, one of the pair of parcel supports extending into the top surface and the front surface, and the damper base of one of the pair of rear wheel houses extending into the bottom surface, and
   wherein each parcel support includes: a first support member having a first surface continuing into the top surface, and a second surface hanging down from a front end of the first surface and bonded at a bottom end to a vertical middle of one of the pair of rear parcel members; and a second support member having a third surface extending forward from the bottom end of the second surface, and a fourth surface hanging down from a front end of the third surface and bonded to the damper base of one of the pair of rear wheel houses, and
   wherein each of the pair of second closed cross sections includes:
   a top closed cross section configured from one of the rear parcel members and one first support member; and
   a bottom closed cross section configured from one of the rear parcel members, one second support member, and the damper base of one of the pair of rear wheel houses.

2. The vehicle body rear structure of claim 1, wherein the rear parcel has a first ridge line between the top surface and the front surface, and each second support member has a second ridge line between the third surface and the fourth surface, the second ridge line extending into the first ridge line and extending laterally outward.

3. The vehicle body rear structure of claim 1, wherein each second support member has a work hole in the third surface through which the damper base can be viewed.

4. The vehicle body rear structure of claim 1, wherein a pair of bulkheads are provided for partitioning the first closed cross section and the pair of second closed cross sections.

5. The vehicle body rear structure of claim 1, further comprising a pair of parcel shelf supports for linking a pair of laterally inner end parts of the damper base of each of the pair of wheel houses and a pair of laterally outer end parts of the bottom surface in the parcel cross member, each parcel shelf support constituting a part of one of the pair of second closed cross sections.

6. The vehicle body rear structure of claim 1, wherein the vehicle body rear structure further comprises:
the pair of rear parcel members linking a pair of rear pillars and a pair of laterally outer end parts of the rear surface;
a pair of parcel shelf supports linking the damper base of each of the pair of wheel houses and a pair of laterally outer end parts of the bottom surface; and
a pair of damper supports each provided to the top part of the damper base of one of the pair of wheel houses and bonded to the pair of rear parcel members and the pair of parcel shelf supports.

7. A vehicle body rear structure, comprising:
a pair of vehicle body side parts, each of the pair of vehicle side parts configured from one of a pair of rear wheel houses and one of a pair of rear pillars, and a predetermined gap in a lateral direction is provided between the pair of vehicle body side parts;
a rear parcel provided between the pair of vehicle body side parts and adapted to partition a trunk and a passenger compartment;
a parcel cross member that is bonded to the underside of the rear parcel, and that together with the rear parcel constitutes a first closed cross section extending laterally; and
a pair of rear parcel members and a pair of parcel supports that are bonded to the first closed cross section and constitute a pair of second closed cross sections each extending from the first closed cross section to one of the pair of vehicle body side parts,
wherein the pair of rear wheel houses have damper bases in the top parts, the rear parcel has a top surface vertically partitioning the trunk and the passenger compartment and a front surface hanging down from a front end of the top surface, the parcel cross member has a bottom surface facing the top surface and a rear surface facing the front surface, and
the vehicle body rear structure further comprises:
the pair of rear parcel members linking a pair of rear pillars and a pair of laterally outer end parts of the rear surface;
a pair of parcel shelf supports linking the damper base of each of the pair of wheel houses and a pair of laterally outer end parts of the bottom surface; and
a pair of damper supports provided to the top part of the damper base of each of the pair of wheel houses and bonded to the pair of rear parcel members and the pair of parcel shelf supports,
wherein the vehicle body rear structure further comprises a pair of first support members each bonded to one of the pair of rear parcel members and constituting a pair of top closed cross sections together with the pair of rear parcel members, wherein the pair of top closed cross sections are linked so as to extend into the first closed cross section, and each of the pair of damper supports is superimposed on one of the pair of rear parcel members and one of the pair of first support members, in which state each of the pair of damper supports is bonded to both one of the pair of rear parcel members and one of the pair of first support members.

8. The vehicle body rear structure of claim 7, further comprising a pair of second support members each bonded to one of the pair of rear parcel members and the damper base of one of the pair of rear wheel houses and constituting a pair of bottom closed cross sections together with the first closed cross section,
wherein the pair of bottom closed cross sections are linked so as to extend into the first closed cross section, and the pair of damper supports are each superimposed on one of the pair of rear parcel members and one of the pair of second support members, in which state each damper support is bonded to both one of the pair of rear parcel members and one of the pair of second support members.

9. The vehicle body rear structure of claim 6, further comprising a pair of first support members each bonded to one of the pair of rear parcel members and constituting a pair of top closed cross sections together with the pair of rear parcel members, and a pair of second support members each bonded to one of the pair of rear parcel members and the damper base of one of the pair of rear wheel houses and constituting a pair of bottom closed cross sections together with the first closed cross section,
wherein the pair of top closed cross sections and the pair of bottom closed cross sections are linked so as to extend into the first closed cross section, a pair of protruding flanges arranged alternatingly in the lateral direction are provided to both the pair of first support members and the pair of second support members, the pair of damper supports are each superimposed on one of the pair of rear parcel members and one of the pair of protruding flanges of the pair of first support members, in which state each of the pair of damper supports is bonded to both one of the pair of rear parcel members and one of the pair of protruding flanges of the pair of first support members, and the pair of damper supports are each superimposed on one of the pair of rear parcel members and one of the pair of protruding flanges of the second support members, in which state the each of the pair of damper supports is bonded to both one of the pair of rear parcel members and one of the pair of protruding flanges of the second support members.

10. A vehicle body rear structure, comprising:
a pair of vehicle body side parts, each of the pair of vehicle side parts configured from one of a pair of rear wheel houses and one of a pair of rear pillars, and a predetermined gap in a lateral direction is provided between the pair of vehicle body side parts;
a rear parcel provided between the pair of vehicle body side parts and adapted to partition a trunk and a passenger compartment;
a parcel cross member that is bonded to the underside of the rear parcel, and that together with the rear parcel constitutes a first closed cross section extending laterally; and
a pair of rear parcel members and a pair of parcel supports that are bonded to the first closed cross section and constitute a pair of second closed cross sections each extending from the first closed cross section to one of the pair of vehicle body side parts, wherein the pair of rear wheel houses each have a damper base in a top part thereof, and the vehicle body rear structure further comprises:

the pair of rear parcel members linking the parcel cross member and a pair of rear pillars and bonded at the bottom ends to the damper base of each of the pair of rear wheel houses; and a pair of rear wheel house patches each bonded so as to extend along one of the pair of rear wheel houses and bonded at the top end of one of the pair of rear wheel houses to one of the pair of rear parcel members.

11. The vehicle body rear structure of claim 10, wherein each damper base has a damper support surface part and a base flange extending downward from a peripheral edge of the damper support surface part, each of the pair of rear wheel houses being bonded to the base flange, each of the pair of rear parcel members has a first bonding part bonded to the base flange, and a first extending part extending lower than the first bonding part, and the first extending part is superimposed on one of the rear wheel house patches and one of the pair of rear wheel houses, in which state the first extending part is bonded to both one of the rear wheel house patches and one of the pair of rear wheel houses.

12. The vehicle body rear structure of claim 11, wherein in each of the pair of rear parcel members, the first bonding parts and a plurality of exposure holes through which the damper base or the rear wheel house is exposed are alternatingly arranged in the lateral direction, each of the pair of rear wheel house patches has a second bonding part bonded to one of the pair of rear wheel houses, and second extending parts extending higher than the second bonding part and exposed through the plurality of exposure holes, and the second extending parts are superimposed on the base flange and the rear wheel house, in which state the three members are bonded together.

13. The vehicle body rear structure of claim 10, wherein each of the pair of rear wheel houses includes a U-shaped cross section formed by a side wall facing toward a lateral center, a front wall extending laterally outward from a front end of the side wall, and a rear wall extending laterally outward from a rear end of the side wall, and each of the pair of rear wheel house patches has an extending reinforcing part provided along a ridge line between the side wall and the rear wall and extending laterally outward from the longitudinal middle of the ridge line.

* * * * *